(12) United States Patent
Licht et al.

(10) Patent No.: US 12,305,312 B2
(45) Date of Patent: May 20, 2025

(54) APPARATUS, SYSTEM AND METHOD FOR MAKING A CARBON NANOMATERIAL FIBER AND TEXTILES FROM CARBON DIOXIDE AND MATERIALS AND MATERIALS AND PRODUCTS THEREOF

(71) Applicant: Direct Air Capture, LLC, Venice, FL (US)

(72) Inventors: Stuart Licht, Venice, FL (US); Gad Licht, Venice, FL (US)

(73) Assignee: DIRECT AIR CAPTURE, LLC, Venice, FL (US)

( * ) Notice: Subject to any disclaimer, the term of this patent is extended or adjusted under 35 U.S.C. 154(b) by 0 days.

(21) Appl. No.: 17/825,732

(22) Filed: May 26, 2022

(65) Prior Publication Data
US 2022/0380947 A1   Dec. 1, 2022

Related U.S. Application Data

(60) Provisional application No. 63/193,417, filed on May 26, 2021.

(51) Int. Cl.
| | |
|---|---|
| *D02G 3/16* | (2006.01) |
| *B82Y 30/00* | (2011.01) |
| *B82Y 40/00* | (2011.01) |
| *D01D 5/00* | (2006.01) |

(Continued)

(52) U.S. Cl.
CPC ............ *D02G 3/16* (2013.01); *B82Y 30/00* (2013.01); *B82Y 40/00* (2013.01); *D01D 5/0015* (2013.01); *D01F 9/12* (2013.01); *D02G 3/441* (2013.01); *D02G 3/448* (2013.01); *D10B 2101/122* (2013.01); *D10B 2401/04* (2013.01); *D10B 2401/063* (2013.01); *D10B 2401/16* (2013.01); *D10B 2401/20* (2013.01)

(58) Field of Classification Search
None
See application file for complete search history.

(56) References Cited

U.S. PATENT DOCUMENTS

| | | | |
|---|---|---|---|
| 8,354,593 B2 * | 1/2013 | White | H02K 3/02 |
| | | | 174/126.2 |
| 2009/0282802 A1 * | 11/2009 | Cooper | D02G 3/16 |
| | | | 57/244 |

(Continued)

FOREIGN PATENT DOCUMENTS

| | | | |
|---|---|---|---|
| CN | 102433614 | * | 5/2012 |
| FR | 2921075 | * | 3/2009 |

(Continued)

OTHER PUBLICATIONS

Machine Translation of CN102433614 (Year: 2012).*

(Continued)

*Primary Examiner* — Shawn McKinnon
(74) *Attorney, Agent, or Firm* — Chamberlain, Hrdlicka, White, Williams & Aughtry; Aly Z. Dossa

(57) ABSTRACT

Embodiments of the present disclosure relate to a process for making a carbon nanomaterial fiber product and/or textile product. Such products may have new and/or enhanced properties as compared to similar products and, according to the embodiments of the present disclosure, it is less expensive to make.

22 Claims, 12 Drawing Sheets

(51) Int. Cl.
   *D01F 9/12*   (2006.01)
   *D02G 3/44*   (2006.01)

(56) References Cited

U.S. PATENT DOCUMENTS

2016/0201229 A1\*  7/2016  Yano ................... D01G 23/00
                                                          28/282
2020/0149173 A1\*  5/2020  Licht ................... C01B 32/15

FOREIGN PATENT DOCUMENTS

| WO | 2016138469 A1 | 9/2016 |
| WO | 2018156642 A1 | 8/2018 |

OTHER PUBLICATIONS

Machine Translation of FR2921075 (Year: 2009).\*
International Search Report and Written Opinion of the International Searching Authority mailed Sep. 29, 2022, issued in corresponding PCT Application No. PCT/US2022/031116 (12 pages).

\* cited by examiner

FIG. 11A
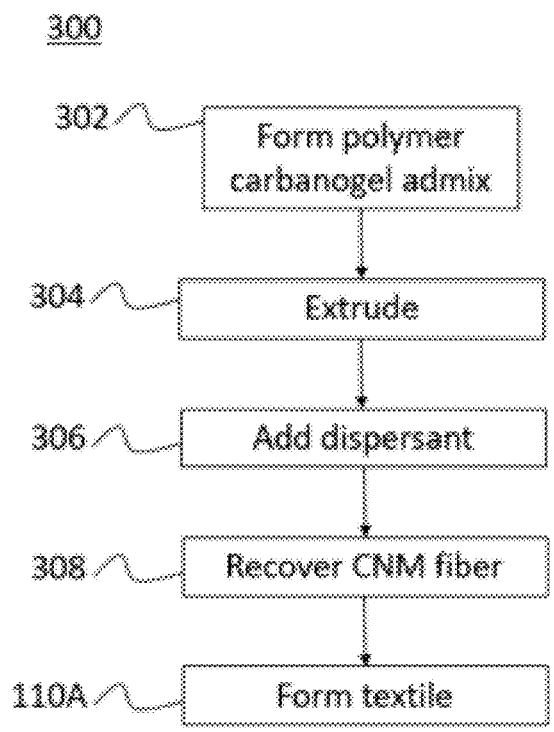
FIG. 11B
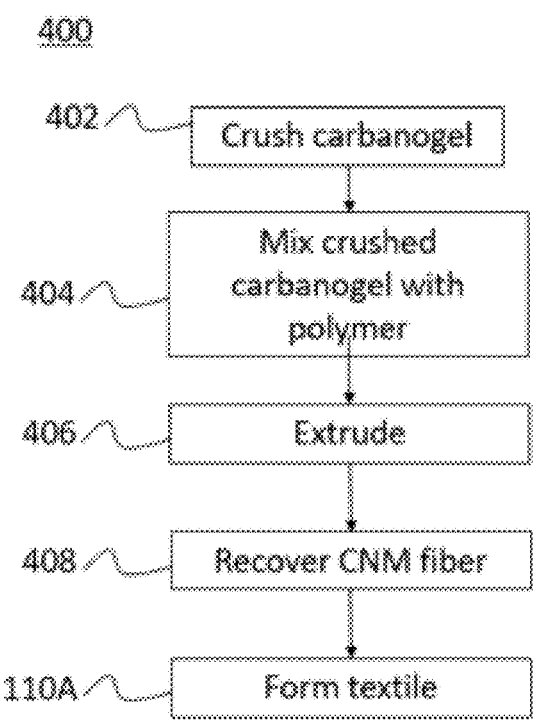
FIG. 11C
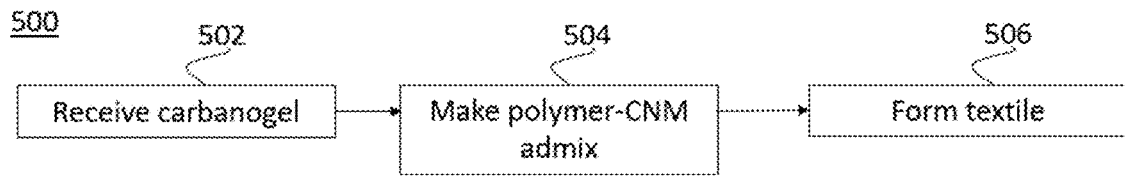
FIG. 11

APPARATUS, SYSTEM AND METHOD FOR MAKING A CARBON NANOMATERIAL FIBER AND TEXTILES FROM CARBON DIOXIDE AND MATERIALS AND MATERIALS AND PRODUCTS THEREOF

CROSS-REFERENCE TO RELATED APPLICATIONS

This application claims priority to and the benefit of U.S. Provisional Patent Application Ser. No. 63/193,417 filed on May 26, 2021, which is hereby incorporated herein by reference in its entirety.

TECHNICAL FIELD

The present disclosure relates to manufacturing a product using an electrolysis process. In particular, the present disclosure relates to methods of making a carbon nanomaterial fiber product from carbon dioxide that is split using the electrolysis process.

BACKGROUND

Fibers have many uses, including but not limited to being made into textiles, fabric, cloths, wires, and meshes. A particularly useful property of fibers is that they can be stitched, tied, and/or sewn together for a wide variety of shapes and repairs. Another useful property of fibers and textiles, is they can act as porous filters or supports. Additionally, fibers and their textiles products are conveniently flexible. Fibers can be stronger than their individual strands by aligning, interweaving, and/or densely packing the strands, such as in textiles. Natural material fibers are generally produced by either dry spinning or solution spinning methodologies while synthetic fibers are generally produced by either dry spinning, extrusion, melt spinning (which may also be referred to as extrusion spinning), solution spinning, or reaction spinning.

One method of making fiber is from material composed of a low-density 3D network of individual strands such as cotton, gels, and wool and then pulling the network (drafting or drawing) to align and tighten the strands prior to spinning them together. Another method is to utilize a sheet of strands and pulling and/or spinning them to form a fiber. In this case, wool or a material with a comparable morphology is the material used to produce a stronger fiber than the starting pre-fiber material.

Carbon fibers are increasingly common in a range of lightweight athletic and vehicle bodies, and known for their lightweight and exceptional strength. Carbon fibers are often produced by solution spinning or an electrospun derivative in which an electric field is applied to align and strengthen the carbon fiber prior to spinning. Generally, a liquid carbon compound, such as the polymer PAN, may be used. The polymer is then carbonized and may be formed using thermoset plastics and/or thermoplastics.

A variety of approaches have been explored to produce fibers with properties superior to that of carbon fibers. Due to their superior physical and chemical characteristics carbon nanomaterials (CNM) have been explored. For example, carbon nanotubes (CNTs) have the highest tensile strength of all materials. Fibers made from CNMs have a significant potential for strong, conductive, textiles and cables. Current methodologies for preparing CNM fibers solution spinning or wet spinning, electrospinning (application of aligning electric field to the solution prior to spinning and to help with material injection out of a spinneret), CNM addition to the fiber, and direct spinning from a chemical vapor deposition (CVD) process. However, these methodologies are beset by challenges of very high cost, poor dispersion of the CNM, high carbon footprint of production and difficulties in imparting the superior properties of the CNMs to the CNM fiber.

As such, new approaches for production of CNM fibers and the materials and products made therefrom that address the challenges of high cost, poor dispersion, the associated high carbon-footprint and difficulties in imparting superior properties to the CNM fiber are desirable.

SUMMARY

Embodiments of the present disclosure relate to a carbon nanomaterial (CNM) fiber and textiles made therefrom that can be used to make materials or products that have new or enhanced properties as compared to materials or products made from non-CNM fibers or without fibers.

Some embodiments of the present disclosure relate to a method for preparing a carbon nanomaterial (CNM) containing fiber the method comprising the steps of: receiving a carbanogel that comprises CNM and electrolyte; fiber processing the carbanogel into a CNM. In some embodiments of the present disclosure, the method may further include a step of forming a textile from the CNM fiber.

Some embodiments of the present disclosure relate to a system for making a CNM fiber, the system comprises: an apparatus for performing an electrolysis process that splits carbon dioxide ($CO_2$) within a molten electrolyte for producing a carbanogel, wherein the carbanogel comprises carbon nanomaterials (CNM) and electrolyte; a vessel for receiving the carbanogel; and a fiber-processing unit. In some embodiments of the present disclosure, the system may further include a textile-forming unit for forming a textile from the CNM fiber.

Other embodiments of the present disclosure relate to a CNM fiber that comprises CNM and electrolyte. Other embodiments of the present disclosure also relate to textiles, fabric and cloths made from CNM fibers prepared according to the methods described herein.

Other embodiments of the present disclosure relate to a CNM textile that comprises CNM and electrolyte. The CNM textile is made with or without CNM fibers. Some embodiments of the present disclosure relate to a method of a making a CNM textile comprising the steps of: receiving a carbanogel; making a polymer-CNM admix; and forming the CNM textile.

Without being bound by any particular theory, in conventional CNM fiber processes, the introduction of CNMs can occur at various stages of the fiber-making process. For example, CNMs are typically introduced as individual, separated and discrete CNMs, or individually bound CNMs, into the fiber in either a dry, melt, solution or reaction spinning fiber process. In contrast, the embodiments of present disclosure relate to introducing a carbanogel (whether compressed into a carbanogel buckypaper or not) with a dispersed, low-density three dimensional (3D) network of CNMs, where the CNMs may be relatively fixed in given positions within the 3D network, and electrolyte content into a CNM fiber that can be processed into a CNM textile. Alternatively, the carbanogel may be processed into a CNM textile without CNM fibers. Akin to the process in which cotton consisting of an analogous low density 3D network is subsequently transformed into a fiber. The carbanogel can consist of a majority or a minority component of the fiber following a fiber forming process, that is into either a dry spinning, a melt spinning, a solution spinning, a wet spinning—differentiated from solution spinning in that the carbanogel or buckypaper contains liquid while in spun to become a fiber—a reaction spinning fiber process or any combination thereof.

Some embodiments of the present disclosure relate to methods for preparing/producing/making CNM fibers or fibers that comprise CNMs that: are less expensive than conventional CNM fiber making processes; facilitates the alignment of CNMs in the fiber; and are produced from $CO_2$ which may help mitigate climate change. The 3D CNM aggregate/network is analogous to that found in cotton, and as with cotton drafting or drawing is readily aligned to allow production of a stronger fiber than the starting pre-fiber material. A further embodiment relates to a method of making a CNM fiber using a sheet of carbanogel buckypaper and pull and/or spin the sheet to form the CNM fiber.

Both carbanogels and carbanogel buckypapers are made by a process that is specific and the result of the molten electrolytic splitting of $CO_2$.

Carbanogels contain the tangled product of the CNM grown on the cathode during the molten electrolytic splitting of $CO_2$. Depending on the electrolysis conditions, a wide variety of nanocarbon morphologies with various new or enhanced properties may be grown as the CNM product. One broad class of CNM is graphitic CNMs, which contain one of more layers of graphene.

Interestingly, carbanogel is resilient, returning to its original state when pressure is removed and allowing it, and depending on access to the excreted liquid, to re-absorb much of the liquid or becoming mostly empty space. This resiliency can be useful in a spinning process preparation of fiber by providing a path for the CNM during the drafting to be drawn out and facilitating alignment of the CNMs in the fiber.

It is known that the high production cost of CNMs and buckypaper is predominantly due to high reactant and energy costs, which causes high cost and high carbon footprint of CNM fibers and textiles. Without being bound by any particular theory, these production costs can be lowered by two orders of magnitude when produced from $CO_2$ by a molten electrolysis process and the produced CNMs can be used to make CNM fibers, in accordance with the embodiments of the present disclosure. Furthermore, and without being bound by any particular theory, a carbanogel and buckypaper produced by the embodiments of the present disclosure may also assist with overcoming the challenge of establishing an even dispersion of CNMs by the carbanogel providing a lattice-like structure that may provide a fixed and dispersed position of the CNM.

BRIEF DESCRIPTION OF THE DRAWING

These and other features of the present disclosure will become more apparent in the following detailed description in which reference is made to the appended drawings.

FIG. 7 shows photographs of scanning electron microscope images of a carbanogel made according to the embodiments of the present disclosure, wherein FIG. 7A shows an image of ×730 magnification; and FIG. 7B shows an image of ×8600 magnification.

FIG. 11 shows two further methods according to the embodiments of the present disclosure, wherein FIG. 11A shows a method that employs a polymer mix and CNM fiber admix; FIG. 11B shows a further method that employs a polymer and CNM fiber, and FIG. 11C shows a further method of making a CNM textile without CNM fiber.

DETAILED DESCRIPTION

Figure 1:
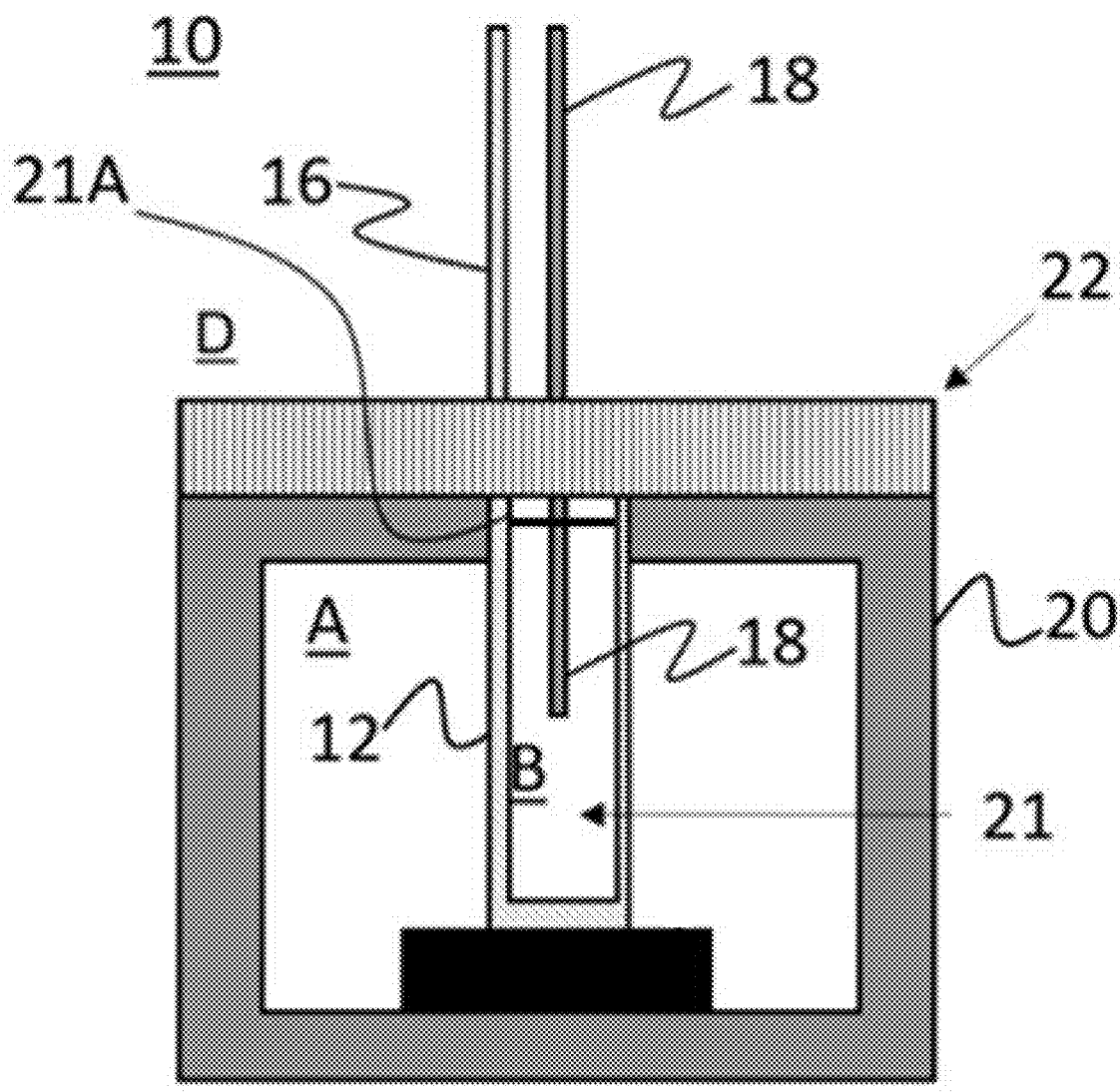
FIG. 1 is a schematic of an apparatus for making a carbanogel product, for use in embodiments of the present disclosure.

Since 2009, the energy efficient conversion of $CO_2$ to carbon and oxidation by molten carbonate electrolysis has been known. Subsequently, the chemical conversion of $CO_2$ to a variety of graphitic carbon nanomaterials (CNMs) was demonstrated. These graphitic CNMs are valuable due to a long-term stability and these materials having useful properties such as ultra-high strength, high electrical conductivity, high thermal conductivity, high battery storage capacity, electromagnetic radiation shielding, effective drug delivery and various medical properties, and useful catalysis properties.

$$CO_2 \rightarrow C_{nanomaterials} + O_2 \qquad \text{(EQN. 1)}$$

EQN. 1 demonstrates a molten electrolysis process whereby the carbon nanomaterials grow and remain on the cathode as a mix of tangled CNMs mixed with the electrolyte. This mixture has been termed a carbanogel, and at least 95% of the electrolyte can be pressed out of this carbanogel by high-temperature press filtration or otherwise. The terms "carbanogel" and "carbanogel product" used in the singular and plural forms, refer to a material that comprises a CNM content and an electrolyte content, where the electrolyte content—relative to the CNM content contribution—may contribute a relatively large, relatively small, a residual amount, a trace amount or a negligible amount of electrolyte to the total carbanogel content. Optionally, the carbanogel may be transformed into a carbanogel buckypaper (CB) that is comprised of compressed carbanogels, According to some embodiments of the present disclosure, carbanogels may be embedded in a polymer (or co-extruded with a polymer, such as an epoxide) to form a polymer-CNM admix that can be processed into a polymer-CNM sheet. The carbanogels, CB, polymer-CNM sheet or any combination thereof may be introduced into an appropriate step of the fiber processing for generating CNM fibers. In another embodiment of the present disclosure, a CB or a polymer-CNM sheet may be used directly as a CNM textile without being processed into a fiber.

Inclusion of $sp^2$ bonded carbon components of graphene and the single or multiple layered graphene, which can occur within a CNM component may provide the CNMs within a carbanogel enhanced properties such as, but not limited to, increased strength and conductivity of these CNMs. Additionally, the relative amount of a specific morphology of the CNM may impart additional properties into the carbanogel and products made therefrom. Examples of such morphologies include, but are not limited to: as spherical nanocarbon, solid and hollow nano-onions, nanocarbon of cylindrical allotropes, planar allotropes, helical allotropes, carbon nanotubes (CNTs), nanofibers, graphene, nano-platelets, nano-scaffolds, nano-trees, nano-belts, nano-flowers, nano-dragon, nano-trees, nano-rods, surface modified or metal coated CNMs, amorphous nanocarbon without graphitic characteristics or properties, or any combination thereof. Examples of such additional properties include, but are not limited to: reduced friction, resiliency, thermal conductance, flame resistance, chirality, enhanced surface area of the CNMs within the carbanogel or any combination thereof. These properties are useful for specific applications, including, but not limited to: improved fibers, wires, cables, textiles, lubricators, flexible materials, chiral light absorption, chiral light emission, chiral catalysis, improved electrochemical charge storage, enhanced catalytic activity, fire resistance, or enhanced EMF shielding capabilities. The CNMs within the carbanogel may also include additional features including doping, magnetism, unusual shapes and diminished or enlarged size. Without being limited by any theory, CNTs can include single walled CNTs; multi-walled CNTs; doped CNTs, such as boron, sulfur, phosphorous or nitrogen doped CNTs; magnetic CNTs; bamboo shaped CNTs; pearl shaped CNTs; isotope specific CNTs, such as 12C and 13C CNTs; surface modified or metal coated CNTs; helical CNTs, including single or double braided CNTs; spiral helical CNTs; thin, thick or solid walled CNTs; thin or thick diameter CNTs; short or wool (long) CNTs, or any combination thereof.

According to the embodiments of the present disclosure, a carbon-containing gas can be subjected to an electrolysis process, also referred to herein as the electrosynthesis process, for generating a carbanogel that contains a carbon nanomaterial (CNM) product from the carbon within the gas. The term "carbanogel" is used herein to refer to a mixture of CNM and electrolyte that is a product of the electrolysis process and is localized on the cathode during and after the electrolysis process. The terms "carbon nanomaterial product", "CNM product" and "CNM material" are used herein to refer to a collection of nanocarbon, which may also be referred to as nano-scaled carbon, of one or more morphologies. The term "nanocarbon" is used herein to refer to carbon that is arranged into specific structures, such as graphitic nanocarbon structures, within the nanoscale. In particular, the carbon from the carbon-containing gas can be split into carbon and oxygen using a molten electrolyte media and a variety of electrolysis process configurations. The electrolysis process can cause a mass transfer of carbon from a gas phase into the molten electrolyte media, the solid CNM product or both. The CNM product can be a substantially pure, pure, or impure, carbon nanomaterials (CNMs) including carbon nanotubes (CNTs). The CNM product may comprise one or more morphologies of CNM structures, as described herein above or any combination thereof. Optionally, one or more parameters of the electrolysis process may be adjusted in order to change the relative amount of a given morphology within the CNM product.

As shown in FIG. 1, the electrolysis process may occur within an apparatus 10 that comprises a case 12, which may also be referred to as an electrolysis chamber or electrolysis cell, for housing a cathode 18, where an anode 16 may form at least a portion of an inner surface of a wall of the case 12. Together the two electrodes define an electrolysis space therebetween. As will be appreciated by those skilled in the art, optionally the anode 16 may be separate from the wall of the case 12. The case 12 is configured to house an electrolyte media 21. The electrolysis space B, including an upper surface 21A of the electrolyte, may be in fluid communication with a source of the carbon-containing gas (shown as D in FIG. 1). In some embodiments of the present disclosure, the case 12 may be contained within an insulated housing 20 that is made of a thermal insulator material. The insulated housing 20 may also include a top 22, or sides or bottom (not shown) that is made of a thermal insulator material or not, and the thermal insulator may be from $CO_2$ permeable thermal insulator such as high temperature woven ceramics, or largely $CO_2$ impermeable thermal insulators. Examples of the permeable thermal insulator including, but are not limited to, Morgan Cerablanket®, made from oxides of alumina and silica and may include zirconia, and Morgan Superwool® made from alkaline earth silicates, both rated for temperatures in excess of 1,200° C. Examples of largely CO2 impermeable thermal insulator include the wide range of available commercial firebricks or poured refractory cement and mortars, and examples of which include, but are not limited to: BNZ Materials firebricks and refractory cement and mortar such as PA 20 and 23, and BNZ 2000, 2300, 23A, 2600, 26-60, 2800, 3000 and 3200 rated for temperatures in excess of 1,090° C.

The source of the carbon-containing gas may be various industrial plants including but not limited to: cement manufacturing plants; iron refining plants; steel manufacturing plants; plants that make or use one or more of ammonia, ethanol, magnesium, hydrogen, polymers, plastics, glass; waste water treatment plants, food processing plants. The source of the carbon-containing gas may also be chemical reactors including internal combustion engines and combustion of carbonaceous materials for heating or cooking. Emission gases from a power generating plant, steam generation facility, or pyrolysis reactors may also be a source of the carbon-containing gas. A carbon-containing gas emitted from these sources or in the production of any high carbon-footprint substance may also contribute to or constitute a source of carbon for making a CNM product. In addition, a gas product of the combustion or transformation of fossil fuels for heating, transportation, and carbon products such as polymers and plastics can also contribute to or constitute a source of carbon for making a CNM product. Another substantial source of the carbon-containing gases is the atmospheric greenhouse gases, carbon dioxide and/or methane present in air. Without being bound by any particular theory, the transformation of carbon-containing gas from anthropogenic or natural sources into graphitic CNMs is particularly important due to the high stability and long life of graphitic based structures (graphite, has a lifetime as found in natural geologic deposits that are of hundreds of millions of years old), which can sequester GHGs from the carbon cycle to mitigate climate change and global warming.

In some embodiments of the present disclosure, the anode 16 is formed as a planar structure, a wire structure, a screen, a porous structure, a conductive plate, a flat or folded shim, a coiled structure or the anode can form at least part of an inner side wall of the case 12. The anode 16 can be formed of various conductive materials so that the anode 16 may be oxygen generating or not. Such anode-forming materials include, but are not limited to: any conductive material that has a stable layer, or establishes, a highly stable oxide outer layer that is conducive to oxygen production during the electrolysis reactions performed according to the embodiments of the present disclosure, Ni, Ni alloys, galvanized (zinc coated) steel, titanium, graphite, iron, and a wide variety of metal which establish a highly stable oxide outer layer that is conducive to oxygen production. Further examples of suitable materials for forming the anode 16 include Nickel Alloy 36 (nickel without chromium, but with iron), Nichrome (nickel chromium-based alloys) including stainless steels such as SS 304 or SS 316, and inconel alloys, such as Inconel 600, 625, and 718, alloy C-264, or Nichromes such as Chromel A, B or, as the co-nucleation of the alloy components are known to produce high quality CNTs. Binary and ternary transition metal nucleation agents may also be useful that include, but are not limited to: Ni, Cr, Sn, In, Fe, and Mo can also affect CNM product growth.

In some embodiments of the present disclosure, a transition metal may be added on to the anode 16, which can be dissolved from the anode 16 to migrate through the electrolyte media 21 onto the cathode 18. The added transition metal can function as a nucleating agent, which may be selected from nickel, iron, cobalt, copper, titanium, chromium, manganese, zirconium, molybdenum, silver, cadmium, tin, ruthenium, zinc, antimony, vanadium tungsten, indium, gallium, or non-transition metals such as germanium or silicon, or a mixture thereof, including, but not limited to brass, Monel, and nickel alloys. The transition metal may also be introduced as a dissolved transition metal salt within the electrolyte media 21 directly to migrate onto the cathode 18. It is also possible to add the transition metal nucleating agent directly onto the cathode 18.

In some embodiments of the present disclosure, the cathode 18 is formed as a planar structure, a wire structure a screen, a porous structure, a conductive plate, a flat or folded shim, a sheet, a coiled structure or the cathode can form at least part of an inner side wall of the case 12. The cathode 18 can be formed of various conductive materials that reflect the need for variation of the nucleation point and the CNM product that forms on the cathode 18. Such cathode-forming materials include, but are not limited to: any conductive material, galvanized (zinc coated) steel, titanium, graphite, iron, an alloy that comprises copper and zinc, Monel (Ni 400, a Ni/Cu alloy), Inconel, stainless steel, iron, Nichrome, pure Cu, and brass alloys may also be suitable as materials for making the cathode 18.

The anode 16 and the cathode 18 may be aligned substantially parallel to each other within the case 12, such as a stainless steel case or a case made of substantially pure or pure alumina. The case 12 may be made of any material that is suitable to contain the molten electrolyte media 21 and to sustain the temperatures achieved by the apparatus 10A. The electrodes may be oriented in any orientation, including but not limited to substantially horizontally or substantially vertically, but spaced apart from each other so as to define the electrolysis space B therebetween. In some embodiments of the present disclosure, the electrolysis space B is between about 0.1 cm and about 10 cm. In some embodiments of the present disclosure, the electrolysis space B is about 1 cm. As will be appreciated by those skilled in the art, the dimensions of the electrolysis space B will be dictated by the scale of the apparatus 10, such as the size of each electrode, the plenum defined within the case, the amount of electric current applied and combinations thereof.

The anode 16 and the cathode 18 are operatively connected to a source of electric current (not shown), which can be any source of an alternating current or a direct current, either constant or not, that provides a current density of between about 0.001 A/cm$^2$ and 10 A/cm$^2$. In some embodiments of the present disclosure, the current density provided between the electrodes is at least 0.02 A/cm$^2$, 0.05 A/cm$^2$, 0.1 A/cm$^2$, 0.2 A/cm$^2$, 0.3 A/cm$^2$, 0.4 A/cm$^2$, 0.5 A/cm$^2$, 0.6 A/cm$^2$, 0.7 A/cm$^2$, 0.8 A/cm$^2$, 0.9 A/cm$^2$, 1.0 A/cm$^2$ or greater. The power for the source of electric current may be any power source or combination of power sources, including electrical power sources, solar power sources and the like.

The source of heat (not shown) can be any source of heat that increases the temperature within the case 12 to a temperature that causes the electrolyte media 21 to transition to a molten phase. For example, the source of heat can achieve a temperature within the case 12 of between about 500° C. and about 850° C. or higher. In some embodiments of the present disclosure, the heating achieves a temperature between about 700° C. and about 800° C., between about 720° C. and about 790° C., or between about 750° C. and about 780° C. In some embodiments of the present disclosure, the heating achieves a temperature of 749-750° C., 751-752° C., 753-754° C., 755-756° C., 757-758° C., 759-760° C., 761-762° C., 763-764° C., 765-766° C., 767-768° C., 769-770° C., 771-772° C., 773-774° C., 775-776° C., 777-778° C., or 779-780° C. In some embodiments of the present disclosure, the temperature within the case 12 can be increased to about 800° C. or hotter. In some embodiments of the present disclosure, the source of heat is provided by, or is supplemented by, the exothermic reaction of $CO_2$ absorption and conversion to carbonate (mass transfer from the gas phase to the solid phase CNM product), or an overpotential of applied electrolysis current.

In some embodiments of the present disclosure, the electrolyte media may comprise a carbonate that can be heated by the heat source until it transitions to a molten phase. For example, the carbonate may be a lithium carbonate or lithiated carbonate. Molten carbonates, such as a lithium carbonate ($Li_2CO_3$), which has a melting point of 723° C., or lower melting point carbonates such as $LiBaCaCO_3$, having a melting point of 620° C., when containing oxide includes spontaneous oxide formation that occurs upon melting, or that is a result of electrolysis or when mixed with highly soluble oxides, such as $Li_2O$, $Na_2O$ and $BaO$, sustain rapid absorption of $CO_2$ from the space above the molten electrolyte media. Suitable carbonates may include alkali carbonates and alkali earth carbonates. Alkali carbonates may include lithium, sodium, potassium, rubidium, cesium, or francium carbonates, or mixtures thereof. Alkali earth carbonates may include beryllium, magnesium, calcium, strontium, barium, or radium carbonates, or mixtures thereof. In some embodiments of the present disclosure, the electrolyte can be a mixed composition for example, a mix of alkali carbonates and alkali earth carbonates and one or more of an oxide, a borate, a sulfate, a nitrate, a chloride, a chlorate or a phosphate.

According to the embodiments of the present disclosure, the carbanogels are formed by the molten carbonate electrolytic splitting of $CO_2$. The carbanogels comprise a mixture of a CNM network and electrolyte that remain after the electrolysis process is stopped. Interestingly, not only can the carbanogel retain the CNM network after crushing, but the crushed pieces can be reassembled to form a buckypaper. Some, most, substantially all or all of the electrolyte can be removed from the buckypaper by pressing, reacting or washing the electrolyte out. Pressing the crushed pieces, with or without the electrolyte, can result in a contiguous layer that may be referred to as CB (carbanogel buckypaper). After removing some or all of the electrolyte, the CB consists of CNMs composed of high purity carbon. After removing some or all of the electrolyte, the CB may define internal voids. For example, the carbanogel or CB may define void spaces within the CB, upon the CNM surfaces within the CB, within the CNM (internal of the CNM) or combinations thereof. For the purposes of this disclosure, the term "void" means a two or three-dimensional space within the CB that is substantially free of electrolyte or other matter. As such, CNM fibers and CNM textiles (made with or without CNM fibers) will define voids.

In some embodiments of the present disclosure, the voids defined within the carbanogel or CB may be partially, substantially filled or completely filled with a void-filling agent, such as an application-based material. Examples of suitable void-filling agents include, but are not limited to: a strengthener, a catalyst, a dopant, a medicine or an electromagnetic field (EMF) shielding agents. Strengtheners can include, but are not limited to thermoset plastics, thermoplastics, epoxies, resins and other polymers, cementitious materials and metals. Catalysts can include, but are not limited to materials to expedite chemical or electrochemical reactions. Dopants can include, but are not limited to materials that at low quantity within the voids materially affect the physical chemical properties of the carbanogel or CB. The CNM components the carbanogel or CB can be aligned mechanically, electrically or magnetically during the carbanogel or CB formation to further enhance the carbanogel or CB properties, including, but not limited to strength, electrical, and thermal properties. The electrical and/or magnetic alignment is achieved with application of an orienting electrical and/or magnetic field during the carbanogel or CB preparation stages. Magnetic CNMs are prepared by incorporating magnetic materials, such as but are not limited to: one or more of iron, nickel, cobalt, gadolinium, samarium, neodymium, steel, or their carbides, and other alloys comprising one or more magnetic materials with ferromagnetic properties, paramagnetic properties, diamagnetic properties and any combination thereof. Magnetic properties of the magnetic CNM fibers include flexible magnets, magnetic storage and electromagnetic shielding.

It is known that the high production cost of CNMs is predominantly due to high reactant and energy costs. Without being bound by any particular theory, these production costs can be lowered by two orders of magnitude when produced from $CO_2$ using a molten electrolysis process according to the embodiments of the present disclosure.

Without being bound by any particular theory, the inventors theorized that fused residual electrolyte in the carbanogel particles may provide a driving force for homogeneous dispersion of the CNMs that—after combining—results in assembly of the processed carbanogel particles into a CNM fiber or a CNM textile in a relatively dispersed fashion without requiring sonication or other more rigorous mixing processes. Carbanogels prepared during the electrolytic process for splitting $CO_2$, include both CNM and electrolyte and this combined presence may provide a fixed structure that is effectively a lattice matrix of "pre-dispersed" CNM. As used herein, the term "textile", used in the singular and plural forms, refers to a cloth, a sheet, a fabric, a tarp or yarn that may be produced by interlacing multiple fibers, knitting multiple fibers, crocheting multiple fibers, bonding multiple fibers, weaving multiple fibers, aligning multiple fibers, densely packing multiple fibers, stretching multiple fibers, squeezing multiple fibers, flattening multiple fibers, spreading multiple fibers, another approaches to produce a textile material with a span that is wider than that of the input fibers or any combination thereof. As used herein, the term "CNM textile", used in the singular or plural forms, refers to a textile that comprises a CNM that imparts new or enhanced properties into the CNM textile, as compared to a textile made without any CNM. For clarity, a CNM textile can be made with CNM fibers or sheets of non-fibrous CNM.

Some embodiments of the present disclosure relate to a system 200 for making a CNM-fiber 222, which may also be referred to as a CNM fiber-product or a CNM containing fiber. As shown in the non-limiting example of FIG. 2, the system 200 comprises an apparatus 210 for performing an electrolysis process that splits carbon dioxide ($CO_2$) within a molten electrolyte for producing a carbanogel, a vessel 212 and a fiber-processing unit 221. The system 200, including various of the optional components described below, may be used to perform the methods of the present disclosure, as described herein below.

In some embodiments of the present disclosure, the apparatus 210 may be the same or similar to the apparatus 10 described herein above. The apparatus 210 is configured to perform an electrolysis process that splits a carbon-containing gas within a molten electrolyte. The product of that splitting is a CNM product with bulk or residual electrolyte there within, namely a carbanogel that may also be referred to as a carbanogel product.

The vessel 212 that receives the carbanogel (as shown by line X in FIG. 2), whether as a cool product or hot product. The vessel 212 can be made of various materials and be of any shape and dimension, provided that the vessel 212 is robust enough to withstand the temperatures of the carbanogel received there within.

The fiber-processing unit 221 processes the carbanogel received from the vessel 212 into the CNM fiber. In some embodiments of the present disclosure, the fiber-processing unit 221 may be various suitable components, mechanisms or machines that spins and/or pulls the carbanogel 222 into the CNM fiber. For example, the fiber-processing unit 221 may comprise a dry spinning unit, a melt spinning unit, an extrusion spinning unit, a solution spinning unit, a reaction spinning unit or any combination thereof. In some embodiments of the present disclosure, the CNM fibers are formed into one or more CNM textiles.

In some embodiments of the present disclosure, the system 220 may also include a compression unit 214 for applying a compression force to the carbanogel received in the vessel 212 for making a carbanogel buckypaper (CB) from the carbanogel. The compression unit 214 can be various suitable components, mechanisms or machines that apply a compressive force upon the carbanogel within the vessel 212. The amplitude of the compressive force can vary depending on the size of the carbanogel particles received in the vessel 212 and the extent to which the carbanogel comprises electrolyte, as discussed further below. In some embodiments of the present disclosure, the compression mechanism 214 includes a vacuum that can pull the carbanogel (as shown by line Y in FIG. 2) through a filter, either within or into the vessel 212.

As such, the fiber processing unit 221 may receive carbanogel or CB and process the carbanogel or CB, as the case may be, into the CNM fiber 222.

In some embodiments of the present disclosure, the fiber-processing unit 221 can generate CNM fibers with different material layers, such as an interior core layer, an external shell layer and optionally, one or more intermediate layers. For example, the CNM fiber product may comprise an internal core layer made from a first CNM (from either a carbanogel or CB) and an exterior shell layer made from a second CNM (from either a carbanogel or CB). The first CNM and the second CNM can be made in the apparatus 210 under different operating conditions so that the first CNM and the second CNM have different desired properties. For example, the first CNM may be relatively less dense and, therefore, the first CNM may define a greater volume of voids than the second CNM, or vice versa. In other non-limiting examples, the first CNM may have a greater relative amount of a desired morphology that is different than the greatest relative morphology of the second CNM; one or both of the first and second CNM may be doped with the same dopant or different dopants; one or both of the first and second CNM may be magnetic and if both are magnetic then they may have the same or different magnetic properties; the first CNM may be relatively stronger than the second CNM, or vice versa; the first CNM may be relatively more flexible than the second CNM, or vice versa; the first CNM may have a greater electrical conductivity than the second CNM, or vice versa; the first CBM may have a greater thermal conductivity than the second CNM, or vice versa; the first CBM may have a greater thermal insulator properties than the second CNM, or vice versa or any combination thereof.

As those skilled in the art will appreciate, the CNM fibers made by the system 200 and methods of the present disclosure are not limited to being made of only a first CNM and a second CNM. The CNM fibers of the present disclosure may be processed into fibers from one, two, three or more different types of CNM and individual CNM fibers may also be made up of multiple layers such as, but not limited to: an interior core layer of the first CNM, an exterior shell layer of the second CNM, while one or more intermediate layers of the fiber may be made of a third CNM or the third CNM and a fourth CNM.

In some embodiments of the present disclosure, the system 220 may also include a CNM textile-forming unit 226. The CNM textile-forming unit 226 may be various suitable components, mechanisms or machines that form multiple CNM fibers into a CNM textile where such formed CNM textiles are imparted with the new or enhanced properties by the presence of the CNM fibers. The textile-forming unit 226 can weave, knit, loop, crochet, plait, braid, spread tow or any combination thereof the multiple CNM fibers to form the CNM textile. Additionally, the CNM textile-forming unit 226 may form one or more types of CNM textiles from multiple CNM fibers that are made with the same CNM material, different CNM fibers made with different CNM materials, multiple of the same or similar CNM fibers made with different CNM materials, different CNM fibers made with a same CNM material, multiple CNM fibers and non-CNM fibers or any combination thereof.

CNM textiles made from CNM fibers of the present disclosure may have advantages over CNM fibers that are not formed into CNM textiles, such advantages include but are not limited to: being more easily transportable and handled; having larger structures that may provide enhanced strength, conductivity, EMF shielding or any combination thereof; maintaining desired shape while remaining flexible, lighter weight and more fittable than a bulk solid; having more defined structures for filling voids or filtering or any combination thereof.

In some embodiments of the present disclosure, the system 200 may further include a processing unit 216 for crushing a cooled or hot carbanogel product prior to (or following) being received by the vessel 212. The processing unit 216 can be various suitable components, mechanisms or machines that can withstand the temperatures of the carbanogel, such as but not limited to: a grinder; a mincing unit; a physical press; a pulverizing unit; a mill or any combinations thereof. The resulting particle size of the carbanogel is determined by the extent of the processing operation performed by the processing unit 216.

In some embodiments of the present disclosure, the system 200 may further comprise an electrolyte reducing unit 218. The electrolyte reducing unit 218 can receive the carbanogel product, cooled or hot, directly from the apparatus 210 and/or it may receive the processed carbanogel product from the processing unit 216. The electrolyte reducing unit 218 reduces the electrolyte content and/or the impurity content of the carbanogel product (processed or unprocessed) so that the reduced electrolyte/impurity content of carbanogel can be processed (or further processed) in the processing unit 216 and then received in the vessel 212. Alternatively or additionally, the reduced electrolyte/impurity content carbanogel can be received in the vessel 212 from the electrolyte reducing unit 218.

The electrolyte reducing unit 218 can reduce the electrolyte content and/or impurity content of the carbanogel (processed or unprocessed) by mechanical approaches, chemical approaches, electrochemical approaches or any combination thereof. For example, the mechanical approaches may include various suitable components, mechanisms or machines that can reduce the electrolyte content of the carbanogel, such as a mechanical press that pushes the carbanogel through a mesh, or a sieve, a heater for melting the electrolyte within the carbanogel, a filter (room temperature or high temperature) or any combination thereof. The chemical approaches for reducing the electrolyte content of the carbanogel include one or more washing stations for exposing the carbanogel to one or more chemicals that can dissolve the electrolyte. In addition to reducing the electrolyte content the one or more chemicals may also be applied to dissolve impurities, such as amorphous carbons or metals, from the CNM within the carbanogel. The electrochemical approaches include apparatus for performing selective electrolysis for reducing the electrolyte content and/or impurity content of the carbanogel.

Figure 2:
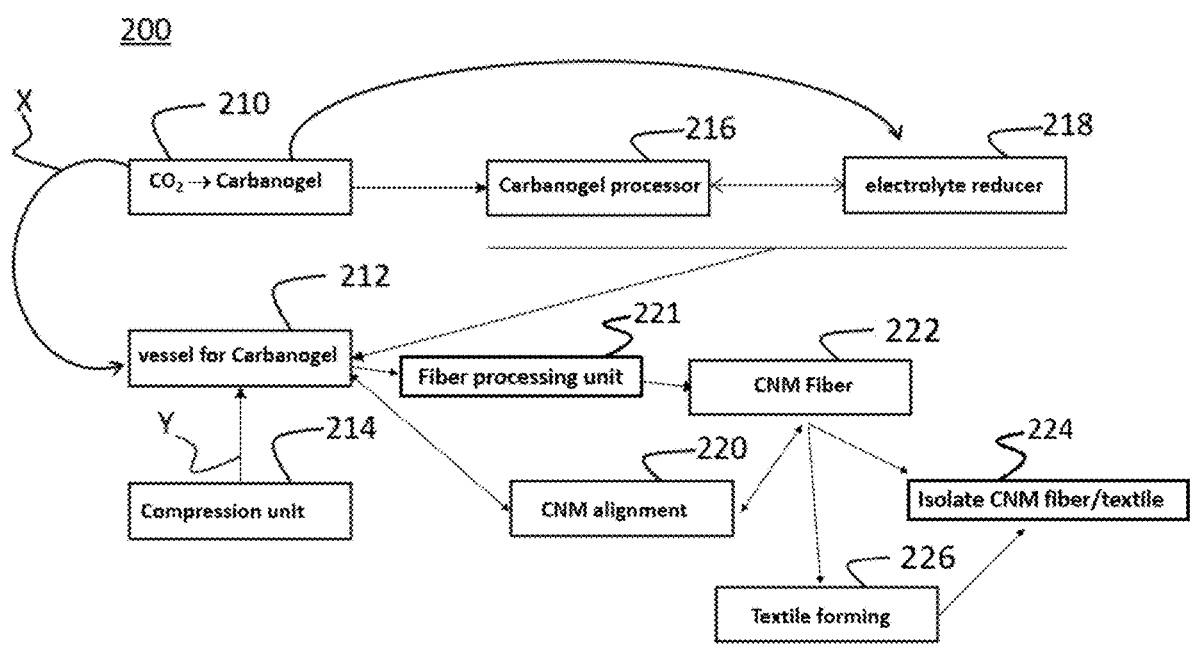
FIG. 2 is a schematic of a system, according to the embodiments of the present disclosure, for making a carbon nanomaterial (CNM) fiber and a textile that comprises CNM fibers.

In some embodiments of the present disclosure, the system 200 may further include an alignment unit 220 that aligns at least a portion of the CNM components in the carbanogel (processed and/or electrolyte/impurity reduced and/or compressed or not), the CB (processed and/or electrolyte/impurity reduced or not) and/or the CNM-fiber 222 (as shown in the non-limiting example of FIG. 2). The alignment unit 220 may be integrated into the vessel 212 such that the alignment procedure performed by the alignment unit 220 occurs within the vessel 212. Alternatively or additionally, the alignment unit 220 may be a separate physical component from the vessel 212 that can receive uncompressed carbanogel (processed and/or electrolyte/impurity reduced and/or compressed or not), perform the alignment procedure and then transfer the aligned carbanogel to the vessel 212 for compression or not. The alignment unit 220 may employ one or more of a mechanical approach, an electric approach, a magnetic approach or any combination thereof so that the aligned CMN components within the CNM-fiber 222 have desired anisotropic properties. The alignment unit 220 may employ a mechanical approach by various suitable components, mechanisms or machines can apply an orienting physical stress field to the CNMs within the carbanogel (processed and/or electrolyte reduced and/or compressed or not) and/or within the CNM-fiber 222. For example, the mechanical approach can apply a shear force to the CNM product within the carbanogel. The shear force can be applied by pulling, spinning or dragging a body, such as a piston, through the CNMs within the carbanogel (processed and/or electrolyte reduced and/or compressed or not) and/or within the CNM-fiber 222. Alternatively, the shear force can be directionally applied to increase CNM entanglement rather than CNM alignment.

The alignment unit 220 may employ an electrical approach by various suitable components, mechanisms or machines that can apply an orienting electrical field to the CNMs within the carbanogel (processed and/or electrolyte reduced and/or compressed or not) and/or within the CNM-fiber 222.

The alignment unit 220 may employ magnetic approach by various suitable components, mechanisms or machines that can apply an orienting magnetic field to the CNMs within the carbanogel (processed and/or electrolyte reduced and/or compressed or not) and/or within the CNM-fiber 222.

In some embodiments of the present disclosure, the alignment unit 220 may be used to decrease rather than increase the directional alignment of the CNM and, therefore, a decrease in any anisotropic properties of the CNM-fiber 222.

In some embodiments of the present disclosure, the system 200 may further comprise an isolation unit 112 for protecting the CNM fiber (processed and/or electrolyte reduced and/or compressed or not) and any CNM textile formed therefrom or otherwise from an oxidative environment. The isolation unit 112 may include a fluid tight vessel that is of suitable dimensions to receive the CNM fiber or formed CNM textile and to remove any oxidative agents, such as oxygen containing gas, from within the vessel, for example by vacuum pump, and to replace and fluids within the vessel with a non-oxygen containing gas, such as an inert gas.

Figure 3:
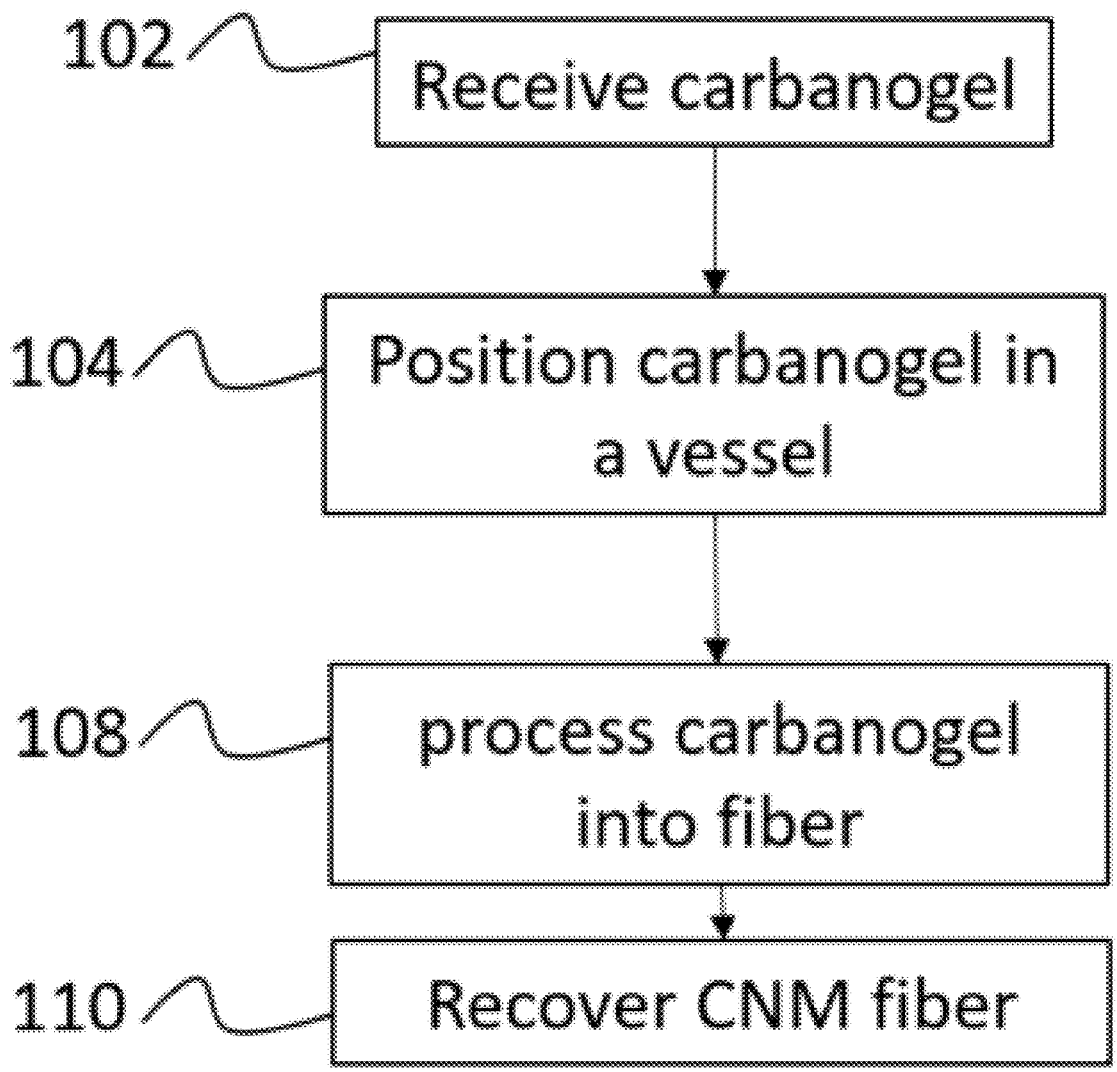
FIG. 3 is a schematic that represents steps of a method for making CNM fibers, according to embodiments of the present disclosure.
Figure 4:
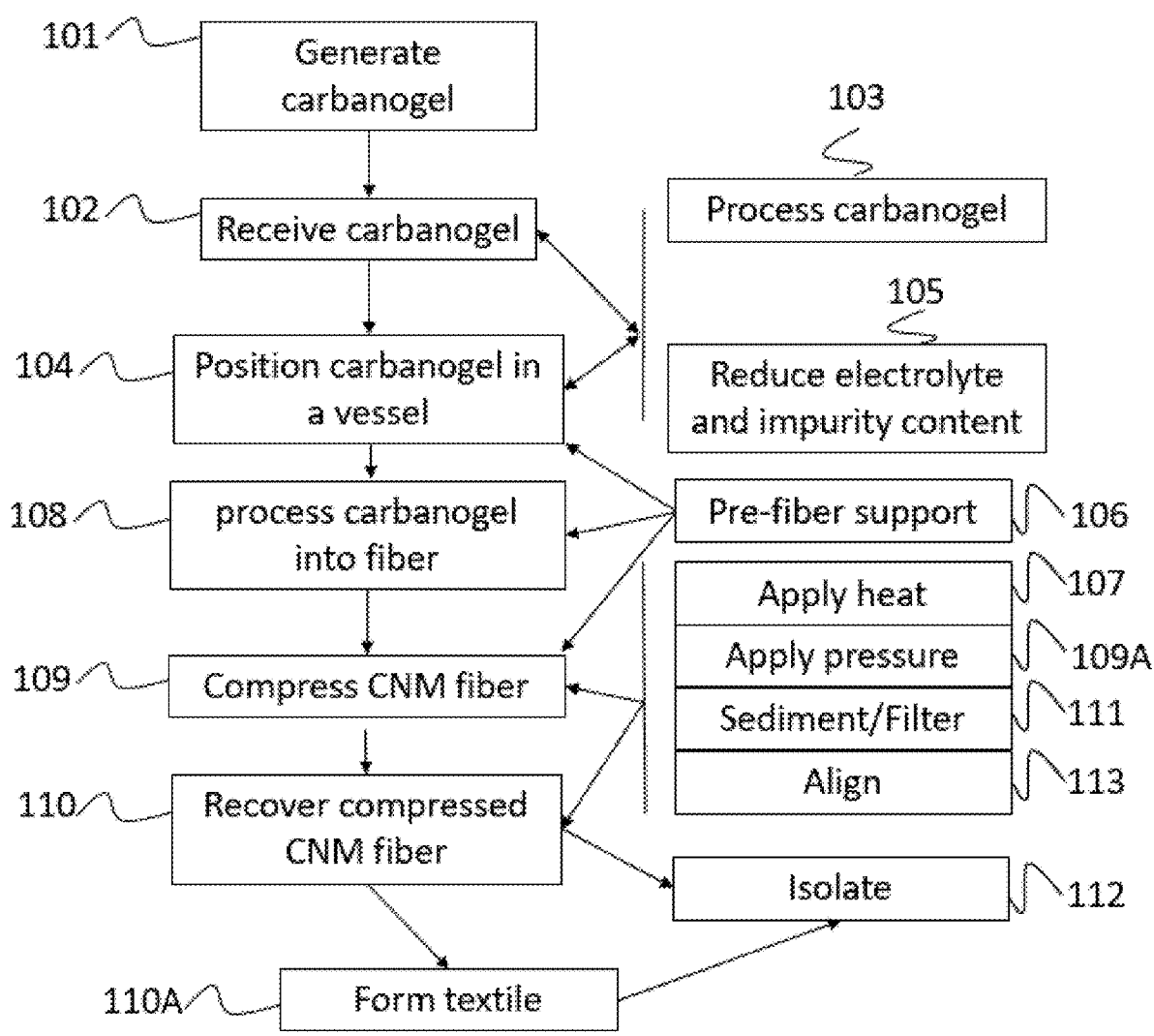
FIG. 4 is a schematic that represents further optional steps of the method of FIG. 3, according to embodiments of the present disclosure.

FIG. 3 shows the steps of a method 100 for making a CNM-fiber, as comprising the steps of receiving 102 a carbanogel, positioning 104 the carbanogel in a vessel, fiber-processing 108 the carbanogel and recovering 110 the CNM-fiber. Optionally, the method 100 may further comprise a step of generating 101 the carbanogel by the electrolysis process described herein above. The method 100 may further comprise the optional steps of compressing 109 the CNM fiber, forming 110A a CNM textile from the CNM fiber, processing 103 and/or reducing 105 the electrolyte and/or impurity content of the carbanogel and/or aligning 107 at least a portion of the CNM content of the CNM-fiber (as shown in FIG. 4).

For the step of receiving 102, the carbanogel may be generated using the electrolysis process described herein above, this may be referred to as the step of generating 101. The generated carbanogel contains the tangled product of the CNM grown on the cathode during the molten electrolytic splitting of $CO_2$. By selectively controlling the operational parameters of the generating step 101, electrolysis process described above, the generated carbanogel can have a greater relative amount of a desired morphology of the CNM within the carbanogel. For example, the electrolysis process can be controlled to increase the relative amounts of a desired morphology, such as: a spherical nanocarbon, solid and hollow nano-onions, nanocarbon of cylindrical allotropes, planar allotropes, helical allotropes, carbon nanotubes (CNTs), nanofibers, graphene, nano-platelets, nanoscaffolds, nano-trees, nano-belts, nano-flowers, nano-dragon, nano-trees, nano-rods, surface modified or metal coated CNMs, amorphous nanocarbon without graphitic characteristics or properties, or any combination thereof as compared to other morphologies of nanocarbon structures within the CNM of the carbanogel. Additionally, by selectively controlling the operational parameters of the generating step 101, the generated carbanogel may have different properties, such as comprising doped CNM or magnetic CNM.

The carbanogel (whether processed and/or electrolyte or impurity reduced or not, as discussed below) is subjected to the fiber-processing step 108 to generate the CNM fiber. The fiber-processing step 108 may comprise one or more steps of spinning and/or pulling the carbanogel to make the CNM fiber and CNM textiles formed from the CNM fibers. The fiber-processing step 108 can occur with or without additives. For example, the residual carbonate electrolyte content within the carbanogel can be reduced may be replaced and supported by a support liquid that may be introduced during an optional supporting step 106 that occurs before, during or after the fiber-processing step 108. Alternatively, the electrolyte may remain in the voids of the carbanogel and it may be solidified/polymerized therein.

In non-limiting examples of the present disclosure, the fiber-processing step 108 includes dry spinning, melt spinning, extrusion spinning, solution spinning, reaction spinning of the aggregates or any combination thereof. A drying step 125 (see FIG. 6) may occur after the fiber-processing step 108 by a compressing step 109, dripping, or some other means to reduce or substantially remove all of the liquid content of the CNM fiber.

Figure 5:
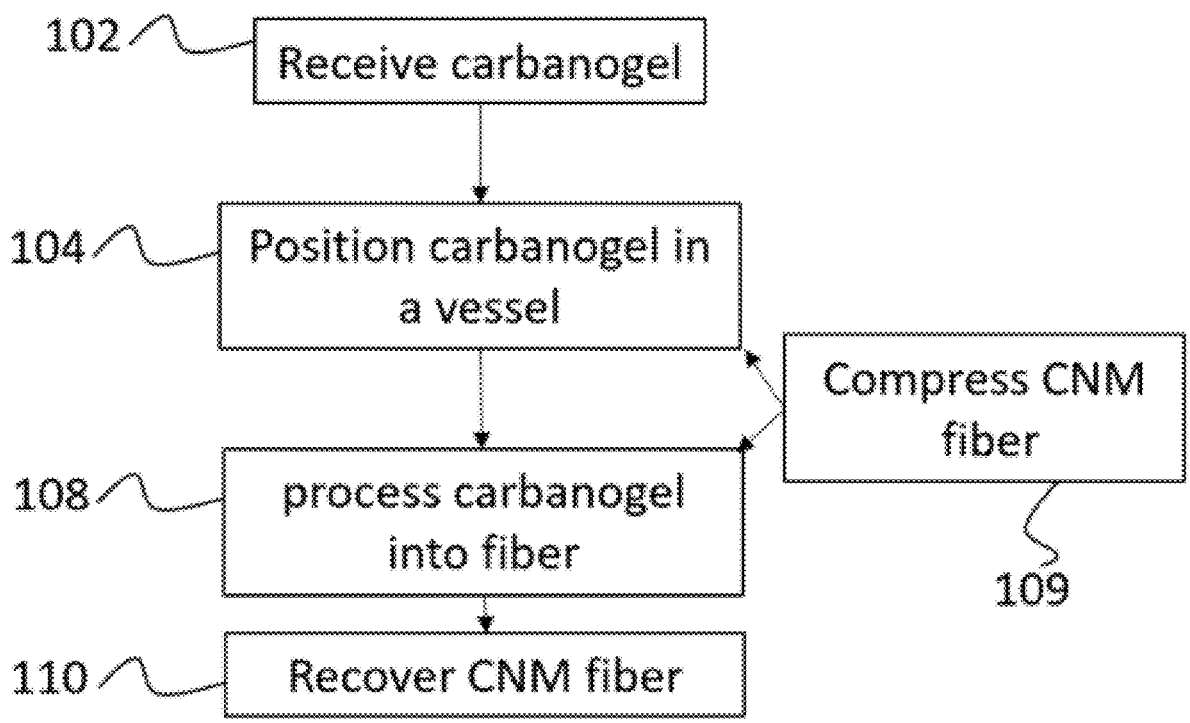
FIG. 5 is a schematic that represents another method for making CNM fibers, according to embodiments of the present disclosure.
Figure 6:
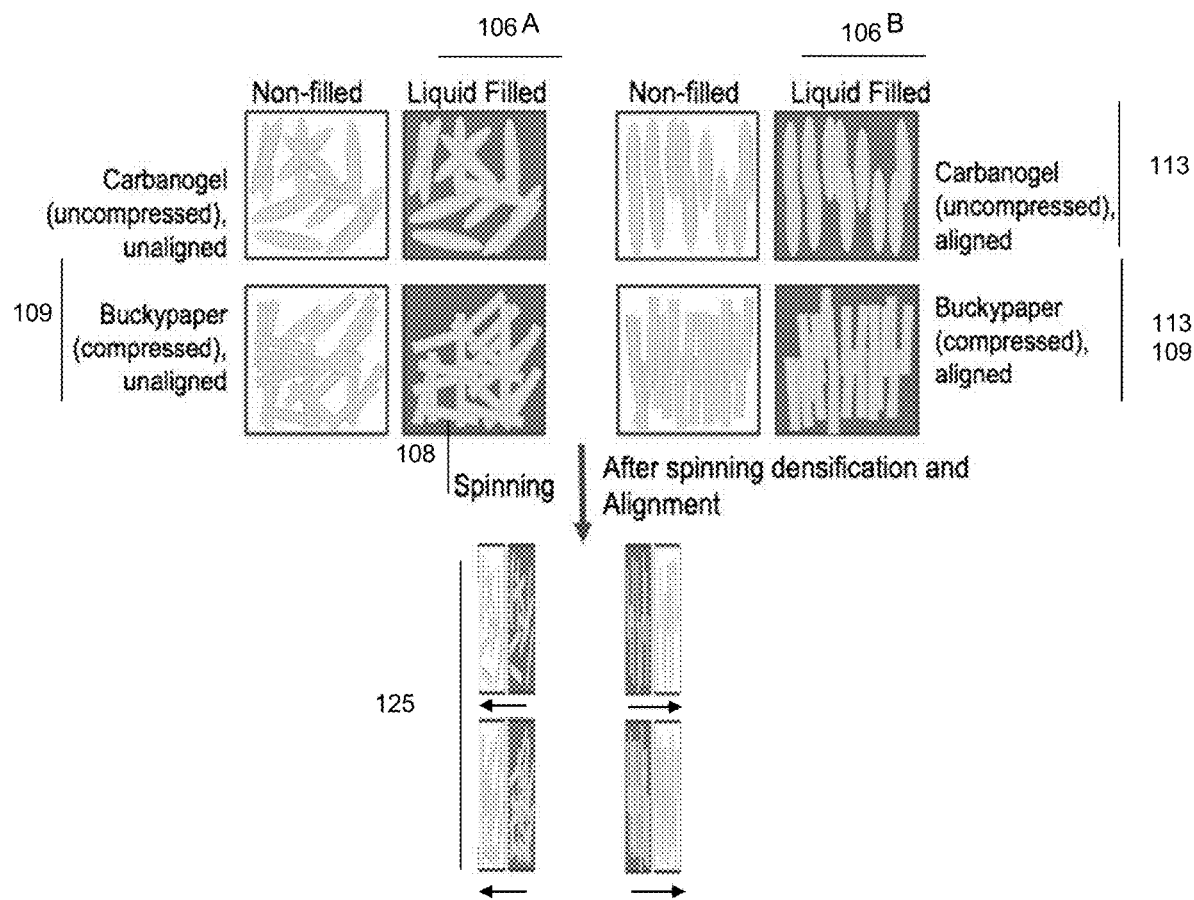
FIG. 6 is a schematic that shows further steps of the methods of the present disclosure.

In some embodiments of the present disclosure, the method 100 may further include the supporting step 106 that occurs prior to, during or after the fiber-processing step 108, where one or more additives may be added to support the fiber-processing step 108 and/or the CNM fiber product. For example, an additive that may be added during the supporting step 106 is the support liquid, which may be added to the carbanogel (or CB), to aid in stabilizing and forming a morphology within the carbanogel (or CB) that preferentially receptive to the step of fiber-processing 108, as may be seen in FIG. 5. Optionally, the support liquid can be removed later by the step of drying 125 (which may also include washing) drying or after forming a CNM textile, and then the support liquid may be recycled (see FIG. 6). In FIG. 6 steps 106A and 106B are respectively part of the pre-fiber supporting step 106, where step 106A is without the step of applying an aligning force (aligning 113) and step 106B is with the aligning 113 step. Step 109 is applying pressure or compression as delineated in step 109 in FIGS. 4 and 5, the aligning step 113 is also shown in FIG. 4. The support liquid may help in drawing material through the fiber-processing unit 221, allowing CNM to move past each other to form the preferred structure, and/or preventing the structure from collapsing too early and/or too fast. Surprisingly, aqueous poly carboxylate superplasticizers, including but not limited to various Adva, Plastol and BASF superplasticizers are suitable to use as the support liquid of the carbanogel. The support liquid can provide a spatial interface from exterior oxygen, and particularly in high temperature processes may also prevent oxidation. Optionally, the support liquid may be polymerized, or in an alternative fashion turned into a solid to provide a support matrix to the CNM fiber for added structure or to provide a change in basic properties of the CNM fiber or for economic reasons. A support matrix encompassing the CNM fiber can be used to lower total CNM in the fiber, adjust useful properties of the CNM fiber, such as melting point for 3D printing, to bond the CNM more strongly together, and/or to align the CNM within the CNM fiber better.

Another example of an additive that may be added during the supporting step 106 is a processing additive, such as a liquid, dispersant or surfactant that facilitates the fiber-processing 108 step. Additionally or alternatively, the processing additive may provide a support matrix that forms around the CNM fiber or CNM textile formed from the CNM fiber. The support matrix can be used to lower the total CNM fraction required in the CNM fiber in order to impart the desired new or enhanced properties from the CNM content, adjust useful properties of the CNM fiber (such as melting point for 3D printing applications), to bond the components of an individual CNM fiber or multiple CNM fibers more strongly together, to lower cost or increase recyclability of the CNM fiber, and/or to align the CNM better. Employing doped CNMs within the carbanogel or CB may further enhance the support provided by the support matrix. For example, CNMs that are doped with a variety of metal particles may act as polymerization catalyst and enhance polymerization reactions that assist in forming the support matrix. Additionally or alternatively, CNMS that are doped with non-metallic dopants may be used to catalyze oxidation and oxygen mediated polymerization reactions that assist in forming the support matrix. Additionally or alternatively, employing CNMs with enhanced electrical or thermal conductivity within the carbanogel or CB may also enhance polymerization or the development of setting regions within the support matrix to assist in forming the support matrix.

Further additives that may be employed during the step of supporting 106 may provide longer term order (in terms of 3D structure) to the support matrix and/or the CNM fiber. The further additives may act as a catalyst to promote formation of the support matrix. The further additives may also promote flexibility or rigidity of the CNM fiber.

The generated carbanogel that contains the CNM product may be received in a step of carbanogel processing 103 that includes allowing the carbanogel to cool, peeling, or breaking off pieces of the carbanogel from the cooled cathode 18, crushing the carbanogel, or any combination thereof. Alternatively, in the step of processing 103, the carbanogel that contains the CNM product can be extracted while still hot from the cathode 18 and containing hot molten electrolyte and then subjecting the hot carbanogel to crushing or other steps of the methods described herein. As such, the step of receiving 102 may be of cooled and solid or hot and thick, fluid carbanogel, which may have been subjected to further processing, or not.

Surprisingly, under compressive pressure during the optional step of compressing 108 the carbanogel particles may assemble to form a contiguous sheet. Several layers of thin crushed carbanogel particles, or one or more layers of larger carbanogel particles can be subjected to the step of compressing 109 to make the CB. As shown in the non-limiting example of FIG. 5, a method 100B includes the same steps of method 100 as show in FIG. 3, with the added step of compressing 109 that may occur before or after the step of fiber-processing 108. For example, one layer of crushed carbanogel particles sized about 25 μm will form a sheet that is approximately, but less than, 25 μm thick. Whereas, four layers of 25 μm sized carbanogel particles will form a sheet that is approximately, but less than, 100 μm thick. Similarly, 1 layer of 100 μm sized carbanogel particles will form a sheet that is approximately, but less than, 100 μm thick.

The step of compressing 109 the carbanogel or the CNM fibers and the optional steps of applying heat 107, applying pressure 109A, allowing sedimentation to occur and/or filtering 111, such as vacuum filtering, and a step of aligning 113 or any combination thereof, to the carbanogel may be repeated more than one time to ensure formation of the desired CB product. Under various conditions, the step of applying pressure 109A may include applying a pressure of between about 1 to about 1,000 psi, between about 1,000 to about 2,000 psi, or above 2,000 psi can be applied to the carbanogel particles to form the CB product. Applying pressure 109A in the higher end of these ranges, or beyond, may be required to form sheets of CB product that are stable at room temperature. Those stable sheets of CB product may then be subjected to a further step of heating 107, optionally in the mold, to temperatures sufficient to melt any residual electrolyte within and among the carbanogel particles. The temperature required to melt any residual electrolyte will depend on the electrolyte composition. In general, the carbanogel particles will tend to decompose where at least a portion of the CNM content of the carbanogel converts to carbon monoxide (CO) at temperatures above 900° C. Although some CNM structures may be sustained within the carbanogel at temperatures of about 1000° C. in the presence of high $CO_2$ gas pressure. For example, a pure $Li_2CO_3$, $Na_2CO_3$, or $K_2CO_3$, electrolytes have a melting point of about 723° C. 851° C., and 891° C. respectively, while a mix of $Li_2CO_3$ and $Na_2CO_3$ can melt at temperature less than about 700° C., and a $Li_xNa_yK_zCO_3$ eutectic melts at 399° C. As such, the step of heating 107 can occur within a temperature range of about 0° C. and about 1000° C., in the presence of high pressure $CO_2$ or a narrower range of about 15° C. and about 900° C. or between about 399° C. and about 850° C.

According to the embodiments of the present disclosure, the step of forming 110A a CNM textile from multiple CNM fibers may comprise weaving, knitting, looping, crocheting, plaiting, braiding, spread towing or any combination thereof. The step of forming 110A may employ multiple CNM fibers that are made with the same CNM material, different CNM fibers made with different CNM materials, multiple of the same or similar CNM fibers made with different CNM materials, different CNM fibers made with a same CNM material, multiple CNM fibers and non-CNM fibers or any combination thereof.

According to the embodiments of the present disclosure, the step of processing 103 can be performed by various approaches such as crushing techniques including, but not limited to: grinding; mincing; pressing; pulverizing; milling or combinations thereof. The resulting particle size of the carbanogel material within the carbanogel is determined by the extent of the crushing. Further and/or more rigorous crushing will result in a smaller carbanogel particle size, which may influence the combining of the polymer mix and the carbanogel as compared to the scenario where the step of processing 103 is performed for a shorter amount of time and/or with less rigor.

In some embodiments of the present disclosure, the electrolyte and/or impurity content of the carbanogels can be reduced by the step of reducing 105. Without being limited, the reduced impurities may include non-graphitic carbons, such as amorphous carbon and metals, or a combination thereof. Some, most, substantially all or all of the electrolyte and or the impurities can be removed from the carbanogel by pressing, reacting or washing the carbanogel with chemical, mechanical or electrochemical approaches. For example, mechanical approaches for the reducing step 105 may include applying physical pressure to the carbanogel to mechanically force electrolyte out of the carbanogel through a sorting device such as a mesh with specific pore sizes. Mechanical approaches may also include regulating temperatures above the melting point of the electrolyte to facilitate electrolyte flow and separation. The melting point of alkali and alkali earth carbonate electrolytes range from less than 400° C. for molten eutectic ternary Li, Na, K carbonate to 891° C. for potassium carbonate. The applied pressure can range from 0 up to 1000 pounds per square inch (psi), 1000 up to 2000 psi, or 2000 or greater psi. Alternatively or additionally, the reducing 105 may include a chemical approach whereby the carbanogel is exposed to one or more chemicals to cause a reaction whereby the electrolyte content of the carbanogel is reduced. For example, a washing liquid can be used to wash the carbanogel, where the washing liquid can dissolve a portion of the residual, or bulk, electrolyte from the carbanogel particles. The washing liquid can include neutral pH liquids such as water or aqueous salt solutions, or acidic or alkaline solutions which can promote dissolution of the molten electrolyte, such as formic or hydrochloric acid, or ammonia sulfate, oxidizing solutions, such as permanganate or peroxide, or organic solvents, or any combination thereof. In addition to reducing the electrolyte the washing liquid can be applied to dissolve impurities, such as amorphous carbons or metals, from the CNM. In some embodiments of the present disclosure, electrolyte content of the carbanogel can be reduced by room temperature filtration and/or high temperature filtration. Further approaches for reducing 105 the electrolyte content of the carbanogel include, but are not limited to: mechanical approaches like sieving and filtering; electrochemical means, such as selective electrolysis; thermal means, such as oxidative removal by combustion of less stable amorphous carbons can also be applied to remove CNM impurities; or any combination thereof. Reducing the electrolyte content of the carbanogel may increase the relative proportion of CNMs in the carbanogel. In some embodiments of the present disclosure, the step of reducing 105 the electrolyte and/or impurity content of the carbanogel can be performed one or more times on the processed or unprocessed carbanogel.

EXAMPLE 1

Carbanogel Used in Fiber, Textile and Cloth Production

Figure 7:
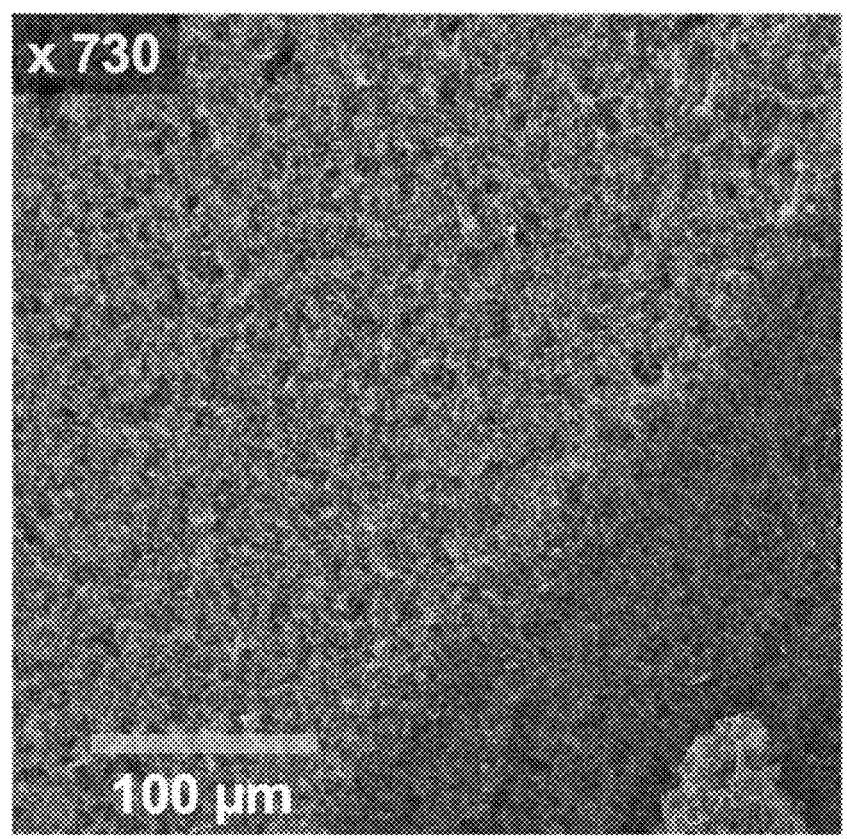
Figure 7:
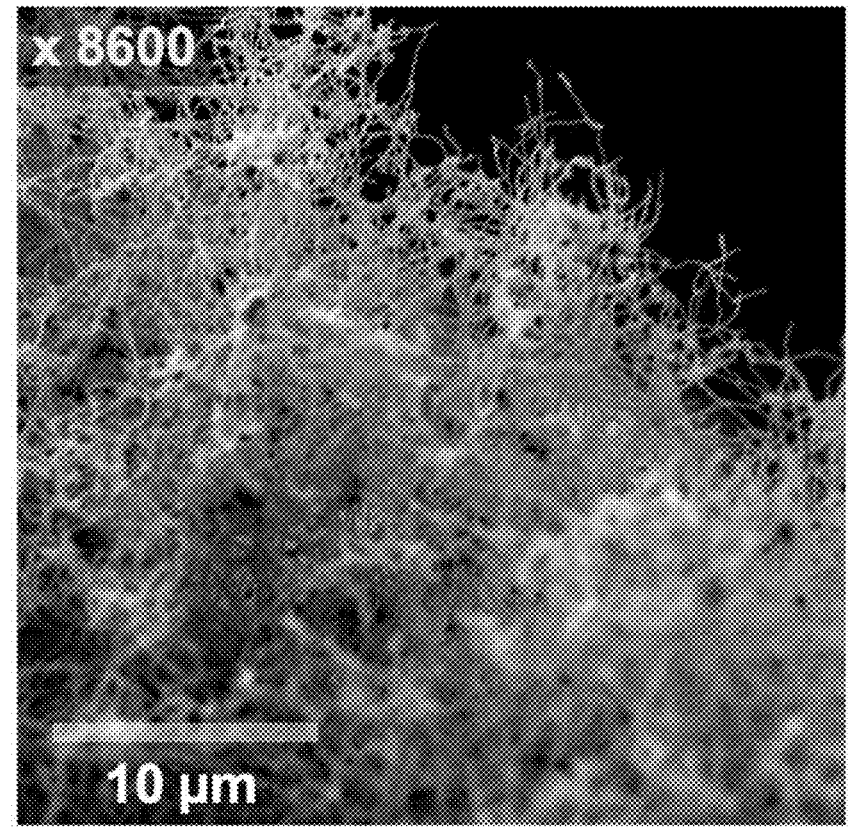

FIG. 7 shows an example of carbanogel with electrolyte reduced by washing, and is shown at two different magnifications of ×720 (upper panel) and ×8600 (lower panel) as measured by scanning electron microscopy, SEM. This example is of a CNT carbanogel as prepared by $CO_2$ electrolysis described hereinabove. The carbanogel of FIG. 7 was made in the apparatus 10 using a steel stainless case 304 in a 750° C. $Li_2CO_3$ molten electrolyte with a Muntz brass cathode and a stainless steel 304 anode producing a CNT carbanogel product. The large particle size of the intermingled CNMs comprising the carbanogel is evident in the upper panel of FIG. 7. This particle size is large compared to the conventional filtration medium porosity and may provide the unusual opportunity for the nano-dimensioned CNMs to be handled macroscopically. In addition to the advantage of being formed from $CO_2$, rather than high carbon footprint reactants, the large particle size of the carbanogel may allow the carbanogel to be readily formed from microscopic restraining filters despite the nanomaterial dimensions of the CNM therein, as shown in the lower panel of FIG. 7. Subsequent to the electrolysis, the carbanogel shown in FIG. 7 was processed by being peeled from the cooled cathode and broken up. The processed carbanogel is shown in the SEM image of FIG. 7 subsequent to washing with concentrated HCl. The high purity of the CNTs and their orientation in a diverse range of directions is also evident in FIG. 7. An alternative wash with dilute HCl acid similarly washed out electrolyte and metal impurities as measured by electron dispersive spectroscopy (EDS) and thermal gravimetric analysis (TGA). An alternative wash with either water or formic acid or ammonium sulfate mainly removed the excess electrolyte, and not any metal impurities. Another alternative wash combining hydrochloric acid and hydrogen peroxide, in this case, sonicating, rather than mixing the carbanogel in a solution of concentrated HCl and 35% $H_2O_2$, removed excess electrolyte, metal impurities, and in addition amorphous carbon impurities. Similarly, other chemical oxidizers, such as hydrochloric acid and potassium permanganate, were observed to be effective with adequate dilution, as have electrochemically generated oxidizers. As measured with TGA, amorphous carbon has a lower combustion temperature as compared to carbon nanotubes and amorphous carbon is more prone to oxidation than the more robust graphitic nanocarbon structures, such as layered graphene CNT structure. Therefore, amorphous carbon may be removed as an impurity by chemical oxidation, electrochemical oxidation, thermal oxidation or any combination thereof. As a further example, heating the carbanogel to 300° C. after HCl wash reducing the impurity content of carbanogel. The reduced impurity content was measured by an observed decreased mass of the carbanogel after the impurity reducing steps and by TGA and SEM. TGA data indicated that the HCl and heating steps of reducing largely removed the amorphous carbon impurity, and the SEM analysis indicated that the carbanogel with the reduced impurity content retained CNTs.

EXAMPLE 2

Figure 8:
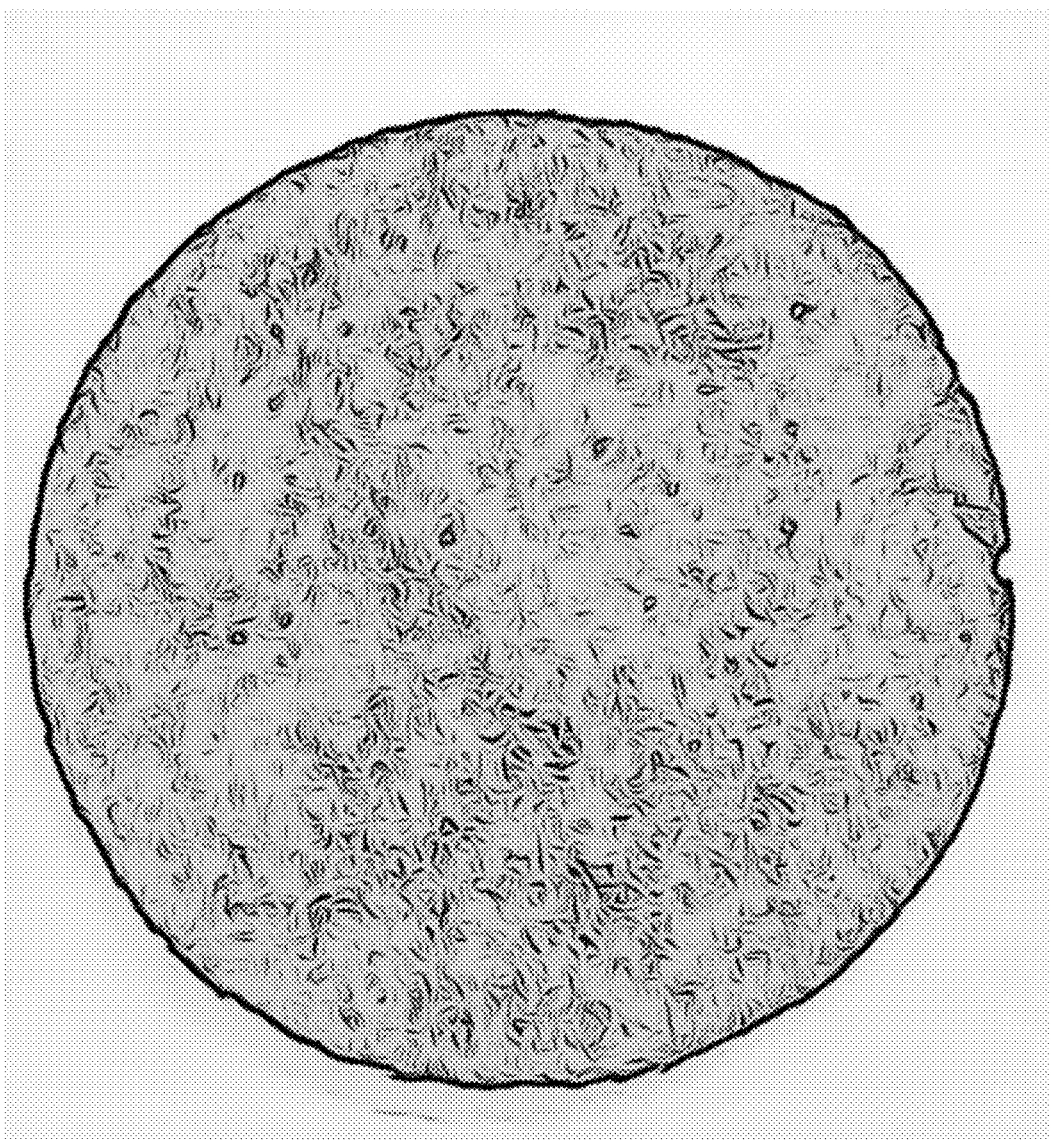
FIG. 8 is a photograph of a carbanogel buckypaper made according to embodiments of the present disclosure.

Carbanogel Buckypaper From Vacuum Filtration for Use in Fiber, Textile and Cloth Production FIG. 8 is a photo of a first example of a carbanogel buckypaper (CB) made from $CO_2$, according to the embodiments of the present disclosure. A CB can then be rolled, and or spun into fiber, or used directly, or laminated, as a cloth. The example is entirely black; the figure was lightened to highlight contrast. The first CB example was made using an electrolysis to transform $CO_2$ to carbanogel. The carbanogel is made in the apparatus 10 using a steel stainless case 304 in a 750° C. $Li_2CO_3$ molten electrolyte with a Muntz brass cathode and a stainless steel 304 anode producing a CNT carbanogel product. The carbanogel was also a made from $CO_2$ CNT product when the cathode was changed to Monel or Ni alloys, including Inconels, Nichromes and Ni-iron and Ni-copper alloys, and the anode was changed to Inconels, Nichromes and Ni-iron and Ni-copper alloys. 0.2 grams of this carbanogel product was cleaned with hydrochloric acid (HCl) and mixed in 300 mL of Isopropyl alcohol, and then sonicated for 30 minutes for an even dispersion. The mixture was then poured into a vacuum filter assembly (Nylon Membrane Filters; 0.2 µm Pore, 47 mm diameter), and the liquid was pulled out under vacuum, a wide range of filter pore sizes and solvents are found to be effective to form buckypaper from $CO_2$ transformed to carbanogel in this manner. The CNTs had mixed orientations in the forming CB, or were aligned when a mechanical force, electrical field or magnetic field was applied during the liquid (alcohol) removal stage. Once all noticeable alcohol was passed through the filter, the filter was taken out and dried overnight at room temperature. The resultant CB was removed off the Nylon Membrane Filter and had a thickness of 180 µm.

EXAMPLE 3

Figure 9:
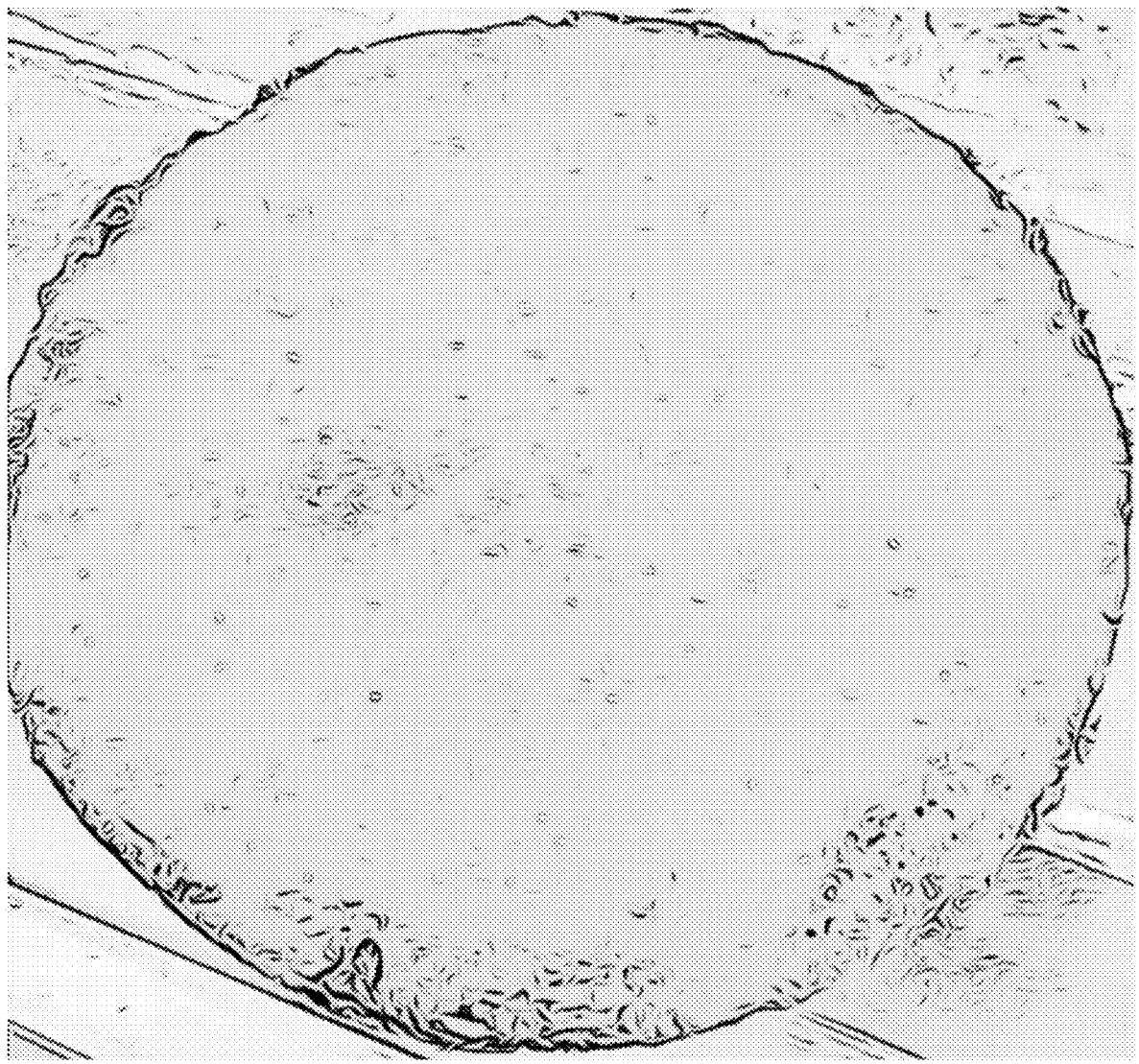
FIG. 9 is a photograph of a further carbanogel buckypaper made according to embodiments of the present disclosure.

Carbanogel Buckypaper From Compression for Use in Fiber, Textile and Cloth Production FIG. 9 is a photograph of a second example of a CB made from $CO_2$. The example is entirely black in color; the figure was lightened to highlight contrast. The FIG. 9 CB example was made from $CO_2$ transformed to carbanogel as described in the previous example, but instead of chemical washing, the electrolyte content of the carbanogel was reduced by compression. Specifically, the carbanogel was generated at the cathode and was then compressed through a mesh or layers of mesh while hot and containing both solid CNM and the molten electrolyte. A 500 psi pressure at 750° C. was used to produce the CB in FIG. 9. Similar, but thinner, CBs were produced at an applied pressure of 1000 psi and higher, while thicker CB was produced with less than 500 psi of applied pressure. The CB shown in FIG. 9 has a diameter of about 350 mm, and approximately 2 fold larger have been also made with 500 psi of applied pressure. The carbanogel has also been directly compressed on the hot cathode (after removal from the case), or as in this example, compressed subsequent to transfer from the cathode. The carbanogel can be transferred while hot, or as in this example, transferred subsequent to processing (such as cooling, peeling, crushing and reheating to remelt electrolyte within the carbanogel) subsequent to transfer from the cathode. The screen mesh sizes used in the compression are measured in units of lines per inch vary from a mesh size of 2 to 100, or a mesh size of 100 to 1,000 or a mesh size above 1,00 lines per inch to reduce the electrolyte from the product. Mesh sizes around 60 with a pore size of approximately 250 µm are particularly effective along with various larger sizes. Note, that the 250 µm pore size is much larger than the nanomaterial dimensions of the CNMs within the CB. Without being bound by any theory, the $CO_2$ transformed buckypaper is formed during compression as the larger size of the intermingled CNM in the carbanogel is retained by the mesh, while the electrolyte passes through the mesh. The resultant CB has a thickness linear proportionally to the starting mass of the carbanogel and approximately inversely proportionally to the applied pressure.

EXAMPLE 4

Figure 10:
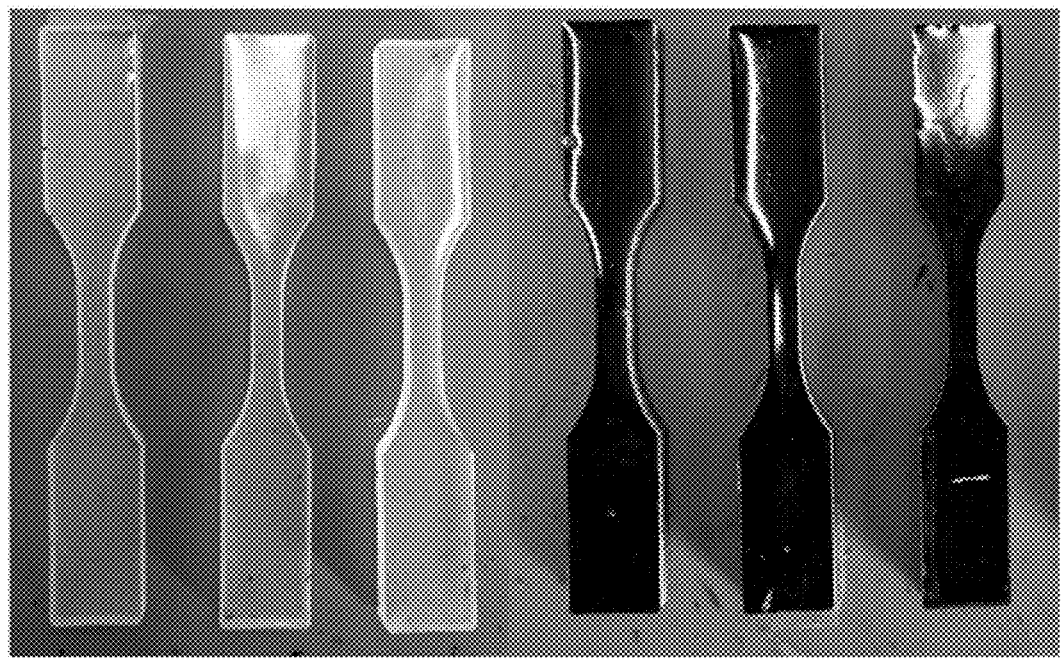
FIG. 10 has two panels that show properties of embodiments of the present disclosure, wherein the upper panel shows photographs of epoxy resin articles made with and without carbanogel and the lower panel is a bar graph that shows the increased tensile strength relative to percent weight addition of carbanogel.
Figure 10:
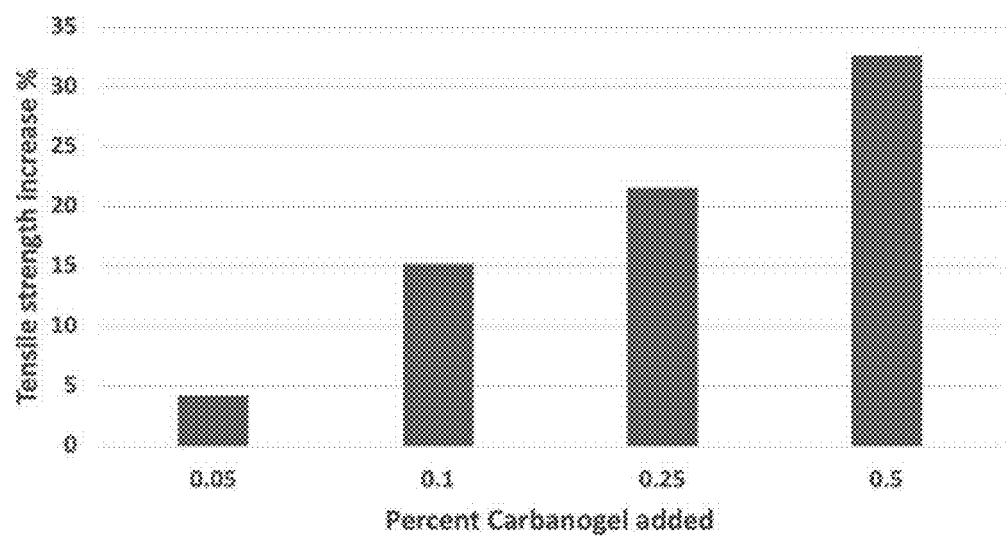

Epoxy-CNM Carbanogel Admix With Increase Tensile Strength for Use in Fiber, Textile and Cloth Production FIG. 10 shows photographs of an example of an epoxy resin with and without added carbanogel made from $CO_2$, according to embodiments of the present disclosure. FIG. 10 also presents tensile strength data from of the epoxy resin with and without added carbanogel made from $CO_2$. An epoxy-CNM can then be rolled, and or spun into fiber, or used directly, or laminated, as a cloth. For example, the epoxy resin mixed with carbanogel can form CNM polymer fibers or polymer-CNM sheets. The upper panel of FIG. 4 shows three articles made without carbanogel (three dog bone shaped articles on the left hand side) and three articles made with carbanogel, according to the embodiments of the present disclosure, the carbanogel articles (three dog bone shaped articles on the right hand side). The carbanogel articles were entirely black and the photographs were lightened to highlight contrast. The carbanogel used to make the carbanogel articles was made using an electrolysis process, as described herein, to transform $CO_2$ into carbanogel. The carbanogel was made in the apparatus 10 using a steel stainless case 304 in a 750° C. $Li_2CO_3$ molten electrolyte with a Muntz brass cathode and a stainless steel 304 anode producing a CNT carbanogel product. The carbanogel was also made from $CO_2$ to make a CNT carbanogel product when the cathode was changed to Monel or Ni alloys, including Inconels, Nichromes and Ni-iron and Ni-copper alloys, and the anode was changed to Inconels, Nichromes and Ni-iron and Ni-copper alloys. This carbanogel product was cleaned with hydrochloric acid (HCl). About 4 parts of Metlab M135 resin and about 1 part of Metlab M135 hardener were degassed separately inside a vacuum chamber at 60° C. Afterwards, the desired 0%, 0.05%, 0.1% 0.25% or 0.5% by weight carbanogel, reduced of electrolyte, containing purified CNT (as compared to the total weight of resin and hardener) was added to the resin and then mixed for 4 min at 65 rpm, then sonicated for 15 min. After sonication, hardener was added, mixed at 65 rpm for 4 min, and then degassed. Samples were cured at 60° C. for in conventional "dog bone" molds and removed for tensile strength testing. The top panel of FIG. 4 shows three cured control samples without added Carbanogel on the top left, and three cured samples with 0.5 wt % Carbanogel on the top right. Tensile strength relative to the control samples was measured with an ETM-10kN Computer Controlled Electronic Universal Testing Production Machine. The lower panel of FIG. 4 shows the observed increase in tensile strength, as compared to the tensile strength of the articles without the added carbanogel. The lower panel in FIG. 4 shows that the samples with 0.05, 0.1, 0.25 and 0.5% wt % carbanogel respectively exhibited 4, 15, 21 and 33% relative increases in measured tensile strength. While this Example 4 depicts a "dog bone" shaped article, it is understood that the CNM and epoxy material, as a non-limiting example of a polymer-CNM admix, can be used as an input into the fiber processing step 108 to make CNM polymer fibers. However, the polymer-CNM admix may also be subjected to a further processing step to make sheet-like articles that can be referred as a CNM textile that is not made from multiple CNM fibers.

EXAMPLE 5

Carbanogel PLA Polymer-CNT Formation Conditions by Polymerization for Fibers, Textiles and Cloths Some embodiments of the present disclosure relate to method for preparing a polymer-CNT admix in which the polymer mix comprises PLA. The polymer-CNM admix can then be processed into materials including, but not limited to a CNM fiber and/or a CNM textile. During this method, the carbanogel is processed by crushing to form carbanogel particles that are added prior to the polymerization step, which then proceeds to form an admix of polylactic acid (PLA) polymer and the crushed carbanogel. The conventional polymerization preparation of PLA proceeds by one of two pathways either condensation (also termed direct) polymerization or ring opening condensation polymerization (also termed open-loop). For example, an aqueous lactic acid solution can be heated and vacuum pumped to remove water, alone or in the presence of a catalyst. Once the reaction is complete or nearly complete, liquid PLA (which melts at about 130-180° C.) can be poured off, or stored for later use as a solid. Either PLA preparation pathway can provide for crushed carbanogel initiation, and/or propagation and/or termination stages of PLA formation, for example adding the CNM (of the crushed carbanogel) to form a PLA-CNM admix.

CNTs are the strongest material known and considerably enhance the strength of the PLA-CNT admix, as compared to PLA alone, and this polymer-CNT admix provides a polymer basis for stronger fibers and textiles. In general, CNTs have not been added to thermoplastics prior to polymerization, and have been added with sonication and/or dissolved thermoplastic solvent mixtures to allow for a homogeneous dispersion of the CNTs or added with extensive mixing during melting prior to extrusion. Instead, and as one example to this embodiment, CNTs are added as crushed polycarboxylate and polycarboxylate salts, which are compatible with PLAs. Aqueous poly carboxylate superplasticizers, including but not limited to various superplasticizers (for example, those commercially available from Adva, Plastol and BASF and other plasticizers) are excellent carbanogel CNM dispersants with conventional mixing, rather than sonication, result in a substantially homogenous dispersion of the crushed carbanogel/polycarboxylate within the PLA polymer admix. Hence, the addition of both crushed carbanogels and polycarboxylates prior to PLA polymerization and without energy wasting sonication, provides dispersed CNMs early and throughout the PLA formation process. In some embodiments of the present disclosure, the crushed carbanogels and/or the polycarboxylate are added subsequent to the polymerization process and then the PLA polymer, the crushed carbanogels and/or the polycarboxylate are subjected to an extrusion process to provides a substantially homogeneous dispersion of the CNMs throughout the PLA polymer.

As such, some embodiments of the present disclosure relate to a further method 300 (see FIG. 11A) of making a CNM fiber, the method comprising the steps of forming 302 a polymer-CNM admix from a polymer mix and processed carbanogel, where the polymer mix comprises one or more polymers and/or polymer precursors and then performing a step of extruding 304 the admix to form a CNM polymer fiber that has a substantially homogenous dispersion of CNM therewithin. In some embodiments, this method further comprises an optional step of adding 306 a CNM dispersant prior to the extruding step 304 and recovering 306 the extruded CNM fiber product. The recovered extruded CNM fiber may then be subjected to the step of forming 110A a CNM textile. In some embodiments of the present disclosure, the extruded product may require a step of fiber-processing to make a CNM fiber before the s0ep of forming 110A.

EXAMPLE 6

Carbanogel PLA Polymer-CNT Formation Conditions By Extrusion for Fibers, Textiles and Cloths In a further embodiment of the present disclosure, the polymer-CNM admixes are prepared using crushed carbanogel particles instead of conventional dispersed CNMs during the polymer extrusion step. The extrusion may utilize a blend of processed carbanogel with either a solid polymer or a melted polymer. This embodiment is compared to a conventional process of PLA-CNT admix preparation. In a conventional process, 0, 2, 4, 6, or 8 wt % of the CNM CNT are mixed by blending with PLA pellets for 8 hours. Sonication without a liquid to convey the sonic energy is not possible in this media. The extended mixing time by blending is an attempt to achieve a homogenous dispersion despite the lack of sonication. The known extrusion process uses a double screw extruder followed by a single screw extruder at temperatures, which increase from 165° C. to 220° C. to form the known PLA/CNT admix for testing. The 6 wt % CNT addition exhibited the largest strength increase. Compared to the PLA with 0% CNT, the 6 wt % PLA/CNT admix produced a 64% increase in tensile strength and a 29% increase in flexural strength. Instead of a conventional CNT, in this embodiment of the present disclosure the processed carbanogel, is added along with the PLA during blending for extrusion. Hence, a comparable PLA-CNT strength increase can be achieved with substantially the same amount of CNT loading, using a much lower blending time, such as less than 1 hour. Mixing of a melted polymer with a carbanogel, according to embodiments of the present disclosure, yields a significant increase in the associated storage modulus.

As such, some embodiments of the present disclosure relate to a further method 400 (see FIG. 11B) of making a CNM fiber, the method 400 comprising the steps of crushing 402 a carbanogel, mixing 404 the crushed carbanogel with a polymer, either a solid polymer or a polymer melt, extruding 406 the mix of crushed carbanogel and polymer, recovering 408 the extruded CNM fiber and forming 110A a CNM textile from the extruded CNM fiber. In some embodiments of the present disclosure, the extruded product may require a step of fiber-processing to make a CNM fiber before the step of forming 110A.

EXAMPLE 7

Polymer-CNM Admixes Alone and in Conjunction With Alternate Layers for Fibers, Textiles and Cloths The polymer-CNM admix may be used alone in a material or product such as in a planar liner, a heat retardant, or heat shield. The polymer-CNM admix may also be used in combination, such as but not limited to laminates, with another material that are not made from the polymer-CNM admix, where the polymer-CNM admix imparts new or improved properties to those other materials. For example, the polymer-CNM admix and its composites have displayed a shape memory property under various activation conditions such as thermal activation, mechanical activation, electrical activation, magnetic activation, photo-activation or chemical activation. This shape memory property can be incorporated into the polymer-CNM admix, a material or product made therefrom and a material or product made from combining the polymer-CNM admix (or material or product thereof) and another material. Note, that in addition to the shape-memory property, when epoxy is used as the polymer in the polymer-NCM admix, there may be an increased tensile strength of up to 184% and an impact strength increase of up to 444% with the addition of 0.1 to 1 wt % when the CNM comprises multi-walled CNTs, which arises by selecting the operating conditions of the electrolysis process. Furthermore, when the operating conditions of the electrolysis process are selected to increase the relative amount of coiled CNTs within the CNM there may be an enhanced spring-effect. These shape memory properties may also be promoted by incorporating anisotropic properties in the polymer-CNM admix by aligning, as described above. The electrical and thermal conductivity of CNMs, such as graphene, may present superior properties for their applications as polymer heating elements or radiators. Incorporating shape-memory properties and heating element behavior may be useful each alone or in combination with layers of another material.

EXAMPLE 8

Carbanogel Fibers Made by Extrusion

Figure 12:
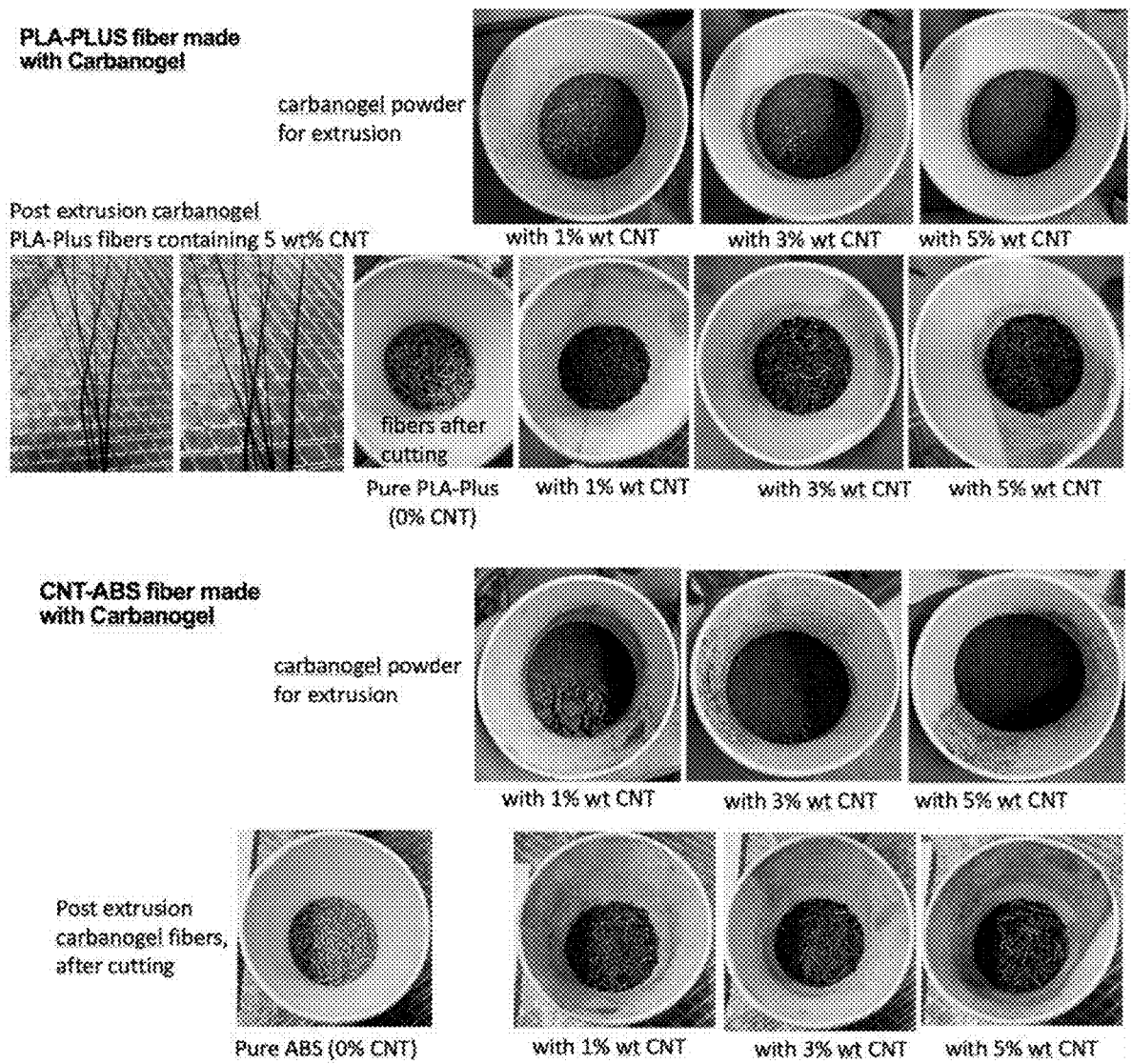
FIG. 12 is a series of photographs that show products made using the CNM fibers, according to the present disclosure, and a polymer mix or a polymer.

FIG. 12 shows photographs of carbanogel fibers made with two types of polymers, PLA or acrylonitrile butadiene styrene (ABS). The top panels of FIG. 10 show long filaments pressed out by extrusion subsequent to polymer mixing with carbanogels, for example by method 300. The carbanogel used to make the carbanogel articles was made using an electrolysis process, as described herein, to transform $CO_2$ into carbanogel. The carbanogel was made in the apparatus 10 using a steel stainless case 304 in a 750° C. $Li_2CO_3$ molten electrolyte with a Muntz brass cathode and a stainless steel 304 anode producing a CNT carbanogel product. The carbanogel was also made from $CO_2$ to make a CNT carbanogel product when the cathode was changed to Monel or Ni alloys, including Inconels, Nichromes and Ni-iron and Ni-copper alloys, and the anode was changed to Inconels, Nichromes and Ni-iron and Ni-copper alloys. This carbanogel product was cleaned with hydrochloric acid (HCl). 0, 1, 3, or 5 wt % of the carbanogel are mixed by blending with the polymer. The extrusion process uses a Felfil Evo Filament extruder at temperatures, which increase from 165° C. to 220° C. to form the carbanogel polymer admix, which is extruded through the filament nozzles for cooling, hardening and fiber collection. The top panels of FIG. 11 show cut carbanogel-PLA plus fibers and the lower panel of FIG. 11 shows carbanogel-ABS fibers with 0, 1, 3 or 5 wt % CNT carbanogel.

Any of the polymer-CNM admixes made according to the embodiments of present disclosure may be used in a method 500 of forming a CNM textile that comprises the steps of receiving 502 a carbanogel (processed and/or electrolyte/impurity reduced and/or compressed or not), making 504 a polymer-CNM admix and forming 506 a CNM textile. The step of making 504 may include a step of extruding a polymer mix (which may include a pre-polymer) and the carbanogel (processed and/or electrolyte/impurity reduced and/or compressed or not) either before, after or during a step of polymerizing the polymer mix. The step 506 of forming the textile may include pressing, squeezing, rolling, heating, extruding, adding a solvent, adding a plasticizer or any combination thereof to form a CNM polymer sheet that may be used as a CNM textile.

Without being bound by any particular theory, the CNM fibers of the present disclosure may be used in material and product applications such as, but not limited to: in liners, heat retardants, or shields. However, the CNM fibers, materials and products made therefrom, according to the embodiments of the present disclosure, may also be used as a component in a composite material such as, but not limited to, a laminate that incorporates at least one layer made from the CNM fibers (whether including a polymerized support matrix or not) with other non-CNM materials to impart improved properties to those other non-CNM materials.

Furthermore, materials and/or products made from the CNM fibers, CNM textiles, and composites made with such CNM fibers may display a shape memory property under thermal, mechanical, electrical, magnetic, light or chemical activation conditions, and these properties can be imparted into materials or products that incorporate (by being impregnated or reinforced with or otherwise integrate) such CNM fibers and CNM textiles. This shape memory effect is promoted by the incorporation of anisotropic properties in the CNM fiber and CNM textiles, as described above. In addition to the applications described herein, shape-memory nanocomposites made from the CNM fibers and CNM textiles of the present disclosure may be useful for making artificial muscles. Furthermore, the electrical and thermal conductivity of the CNM-polymer product may provide superior properties when used in a heating element or radiator application.

Other applications of the materials and products made from the CNM fibers and CNM textiles of the present disclosure that can make use of the superior CNM properties imparted by the carbanogel and/or CB include, but are not limited to: (i) light-weight tooling applications for high speed, safety, and quick changes; (ii) tools that are harder for better drilling, impact, and/or sawing; (iii) tools with better thermal management; (iv) ultra-strong, foldable materials; (v) general sequestering of $CO_2$; (vi) an ultra-light, ultra-absorbent sponge; (vii) as a pre-made laminate sheet for including in a composite; (viii) for ballistic or electromagnetic field (EMF) shielding; (ix) parachutes and drag enhancers; (x) knittable/sew-able polymers for textile/fabrics; or (xi) fibers/filaments for 3-D manufacturing or printing.

Other uses of materials and products made using the CNM fibers, according to the embodiments of the present disclosure, include products that combine the advantage of two or more superior CNM-based properties such as: structural materials that provide dual usage additionally reducing weight, material costs/used, and/or increasing capacity. Some non-limiting examples of such dual uses include: (i) use of strength properties for structural purposes and use of electrical-energy storage properties; (ii) use of strength properties for structural purposes structure and use of thermal-energy storage properties; (iii) use of strength properties for structural purposes use as an electrical conduit or wire; (iv) use of strength properties for structural purposes and use as a sensor to collect real-time strain or safety data to assess the material's performance; (v) use of strength properties for structural purposes and use as a catalyst; (vi) use of strength properties for structural purposes and use as a thermal conduit, or any combination thereof. Also, there are applications and uses of materials and products made using the CNM fiber and CNM textiles, according to the embodiments of the present disclosure, for increasing safety by being used in a heat dispersing member for dispersing high heat, such as in applications where fire is a concern.

The CNM fibers made according to the embodiments of the present disclosure may be composed of one or more CNM fibers type and may be formed into CNM textiles. Different weaving patterns and fiber types may lead to different properties being imparted throughout the CNM textile, such as having seams to prevent or encourage folding in certain areas and along specific directions.

CNM Textiles may contain liquid from the fiber making stage, or liquid may be added after that stage, that may be kept or removed allowing for easier handling during the step of forming the CNM textile, post CNM textile making of polymers, and/or provide other properties including, but not limited, to: enhanced electrical storage and thermoelectric effects.

Examples of carbanogel improved textile uses are, but not limited to, self-cleaning textiles; clothing for safety, as they are more durable, better at heat wicking, shock resistance and safety. This includes, but is not limited to, better clothing for construction workers that will not get ripped easily, bulletproof vests, space suits, lighter, stronger parachutes, filters, ropes and cables for pulleys and other mechanical applications, inflatable structures such as inflatable boats, houses, robots, textiles for fashion and clothing, including stronger, lighter, tougher, self-cleaning, switchable color or electronic enhanced clothing including those for monitoring health, air quality, or control of external devices or to maintain levels of cloth aeration, textiles with catalytic properties to filter air, water, including those that are self-cleaning reactions, filtering air, and textiles with shape memory properties.

We claim:

1. A method for preparing a carbon nanomaterial (CNM)-containing fiber, the method comprising steps of:
   (a) receiving a carbanogel product that comprises:
      a network of a CNM product that comprises nanocarbon structures, wherein such nanocarbon structures are one or more:
         a spherical nanocarbon, a solid nano-onion, a hollow nano-onion, a first nanocarbon of a cylindrical allotrope, a second nanocarbon of a planar allotrope, a third nanocarbon of a helical allotrope, a carbon nanotube (CNT), a nanofiber, graphene, a nano-platelet, a nano-scaffold, a nano-tree, a nano-belt, a nano-flower, a nano-dragon, a nano-rod, a surface modified CNM, a metal coated CNM, and an amorphous nanocarbon, and
      an electrolyte that comprises a carbonate;
   (b) positioning the received carbanogel product in a vessel;
   (c) processing the carbanogel product into a CNM-containing fiber comprising at least a portion of the network of the CNM product dispersed therein, wherein the CNM-containing fiber is larger than individual structures within the nanocarbon structures; and
   (d) recovering the CNM-containing fiber.

2. The method of claim 1, further comprising a step of forming a carbon nanomaterial (CNM) textile from at least one of the CNM-containing fiber and a non-CNM-containing fiber.

3. The method of claim 2, wherein the step of forming comprises at least one of weaving, knitting, looping, crocheting, plaiting, braiding and spread towing or any combination thereof.

4. The method of claim 2, wherein the CNM-containing fiber comprises multiple CNM-containing fibers that are: multiple of a same or similar CNM-containing fiber made with a same CNM material, different CNM-containing fibers made with different CNM materials, multiple of the same or similar CNM-containing fibers made with different CNM materials, different CNM-containing fibers made with a same CNM material or any combination thereof.

5. The method of claim 1, further comprising one or more of:
   a step of compressing the carbanogel product, the CNM-containing fiber or both, a step of reducing an electrolyte content of the carbanogel;
   a step of applying an alignment force to the carbanogel product, the CNM-containing fiber or both, a step of supporting the processing step;
   a step of generating the carbanogel product by a molten electrolytic process for splitting of carbon dioxide ($CO_2$), a step of processing the carbanogel product;
   or any combination thereof.

6. The method of claim 5, wherein the step of supporting comprises adding an additive, selecting a morphology of the CNM, selecting a new or enhanced property of the CNM, polymerizing the additive and any combination thereof.

7. The method of claim 1, wherein the fiber-processing step comprises spinning, pulling or both of the carbanogel product.

8. The method of claim 7, wherein the spinning comprises dry spinning, melt spinning, extrusion spinning, solution spinning, reaction spinning or any combination thereof.

9. The method of claim 5, wherein the step of processing the carbanogel product comprises at least one of grinding, mincing, pressing, pulverizing, milling and crushing or any combination thereof.

10. The method claim 5, wherein the step of reducing comprises pressing, reacting, washing, filtering and any combination thereof.

11. The method of claim 1, further comprising a step of applying heat after the step of receiving the carbanogel product, wherein the heat is between about 0° C. and about 1000° C., or between about 15° C. and about 900°° C., or between about 399° C. and about 850° C.

12. The method of claim 1, further comprising a step of applying an alignment force to the carbanogel by a mechanical force, a chemical reaction, an electric current, applying a magnetic field, or a combination thereof.

13. The method of claim 12, wherein the alignment force is of a radial geometry, a cylindrical geometry, a spherical geometry or other geometry to produce a linear, radial, cylindrical, spherical or other directional geometry to generate one or more anisotropic characteristic properties in the CNM-containing fiber.

14. The method of claim 12, where the step of applying the alignment force occurs during a drafting step, a drawing step or a spinning step.

15. The method of claim 1, further comprising a step of applying a void filling agent for partially or substantially fully filling voids in the carbanogel, the CNM-containing fiber, a CNM textile made from the CNM-containing fiber and any combination thereof.

16. The method of claim 15,
   wherein the void filling agent is a strengthener, a liquid, a catalyst, a dopant, a magnetic material, a medicine, an electromagnetic force shielding enhancing agent or combinations thereof, wherein:
   the strengthener comprises a thermoset plastic, a thermoplastic, an epoxy, a resin, other polymers, a cementitious materials and a metal, or any combination thereof;
   the catalyst comprises a material to:
      expedite a chemical reaction or an electrochemical reaction;

promote CNM/polymer interactions;
promote polymerization; or
a combination thereof;

the dopant can include boron, nitrogen, sulfur, and phosphorous, cobalt, aluminum, silicon, cerium, platinum, gold, ruthenium, osmium, tellurium, tungsten, respective oxides, respective salts, or any combination thereof; and the magnetic material is iron, nickel, cobalt, gadolinium, samarium, neodymium, steel, respective carbides, other alloys comprising one or more magnetic materials with ferromagnetic properties, paramagnetic properties, diamagnetic properties, or any combination thereof.

17. The method of claim 15, wherein the void filling agent is a material that facilitates or optimizes: an electrospinning process, a tribological property of the CNM-containing fiber or the CNM textile, a flow property of the CNM-containing fiber or the CNM textile, catalyzing a polymerization reaction, a condensation reaction, aligning the CNM-containing fibers or the CNM therein, supporting or protecting the CNM-containing fiber or the CNM therein and any combination thereof, or the void filling agent aligns the CNM within the CNM-containing fiber, condenses the CNM-containing fiber, acts as a catalysis, or any combination thereof.

18. The method of claim 1, wherein the carbanogel product is a majority component of the CNM-containing fiber.

19. The method of claim 1, wherein voids in the formed pre-spun and drawn material are partially or fully filled with materials that CNM help align, condense, or in other way change in final product form by condensation or catalysis.

20. The method of claim 1, further comprising a step of preparing a CNM textile by interlacing multiple fibers, knitting multiple fibers, crocheting multiple fibers, bonding multiple fibers, weaving multiple fibers, aligning multiple fibers, densely packing multiple fibers, stretching multiple fibers, squeezing multiple fibers, flattening multiple fibers, spreading multiple fibers, another approaches to produce a material with a span that is wider than that of the input fibers or any combination thereof to combine CNM-containing fibers into the CNM textile.

21. The method of claim 2, wherein the CNM textile comprises a liquid that may be kept or removed during the forming step to allow for easier handling during the forming step, during post textile polymerization, wherein the liquid imparts an enhanced electrical storage property or an enhanced thermoelectric property.

22. A method of a making a carbon nanomaterial (CNM)-containing textile, the method comprising steps of:
(a) receiving a carbanogel that comprises a network of a CNM product that comprises:
one or more of a spherical nanocarbon, a solid nano-onion, a hollow nano-onion, a first nanocarbon of a cylindrical allotrope, a second nanocarbon of a planar allotrope, a third nanocarbon of a helical allotrope, a carbon nanotube (CNT), a nanofiber, graphene, a nano-platelet, a nano-scaffold, a nano-tree, a nano-belt, a nano-flower, a nano-dragon, a nano-rod, a surface modified CNM, a metal coated CNM, and an amorphous nanocarbon, and
the CNM product is dispersed within an electrolyte that comprises a carbonate;
(b) making a polymer-CNM admix by mixing a polymer and the carbanogel; and
(c) forming the CNM-containing textile from the polymer-CNM admix.

* * * * *